United States Patent [19]

Wason

[11] Patent Number: 4,787,054

[45] Date of Patent: Nov. 22, 1988

[54] INTERDIAL COMPENSATION TECHNIQUE FOR ANGULAR POSITION DETECTORS

[75] Inventor: Thomas D. Wason, Raleigh, N.C.

[73] Assignee: Cain Encoder Co., Greenville, N.C.

[21] Appl. No.: 894,782

[22] Filed: Aug. 8, 1986

Related U.S. Application Data

[62] Division of Ser. No. 516,714, Jul. 25, 1983, Pat. No. 4,606,008.

[51] Int. Cl.$^4$ .................. G01R 11/17; G01R 11/25; G06F 15/20
[52] U.S. Cl. ................... 364/571.04; 340/870.05; 364/483; 364/559
[58] Field of Search .............. 364/571, 559, 560, 481, 364/483; 340/347 P, 870.02, 870.04, 870.06, 870.19; 377/28, 39

[56] References Cited

U.S. PATENT DOCUMENTS

| | | | |
|---|---|---|---|
| 3,846,789 | 11/1974 | Germer et al. | 340/870.02 |
| 4,118,787 | 10/1978 | Arnoux | 364/483 |
| 4,166,975 | 9/1979 | Germer et al. | 364/483 |
| 4,318,617 | 3/1982 | Orsen | 364/571 |
| 4,439,764 | 3/1984 | York et al. | 340/347 P |
| 4,590,580 | 5/1986 | Takezawa et al. | 364/571 |

Primary Examiner—Felix D. Gruber
Attorney, Agent, or Firm—C. Robert Rhodes; Judith E. Garmon

[57] ABSTRACT

A transducer formed of one or more electrode arrays is positioned in confronting relation and parallel to the plane of rotation of one or more rotating members. A binary interdial compensation value is generated to correct for errors in the mechanical misalignments of certain ones of the rotating members which would normally lead to ambiguities in the dial readings.

8 Claims, 36 Drawing Sheets

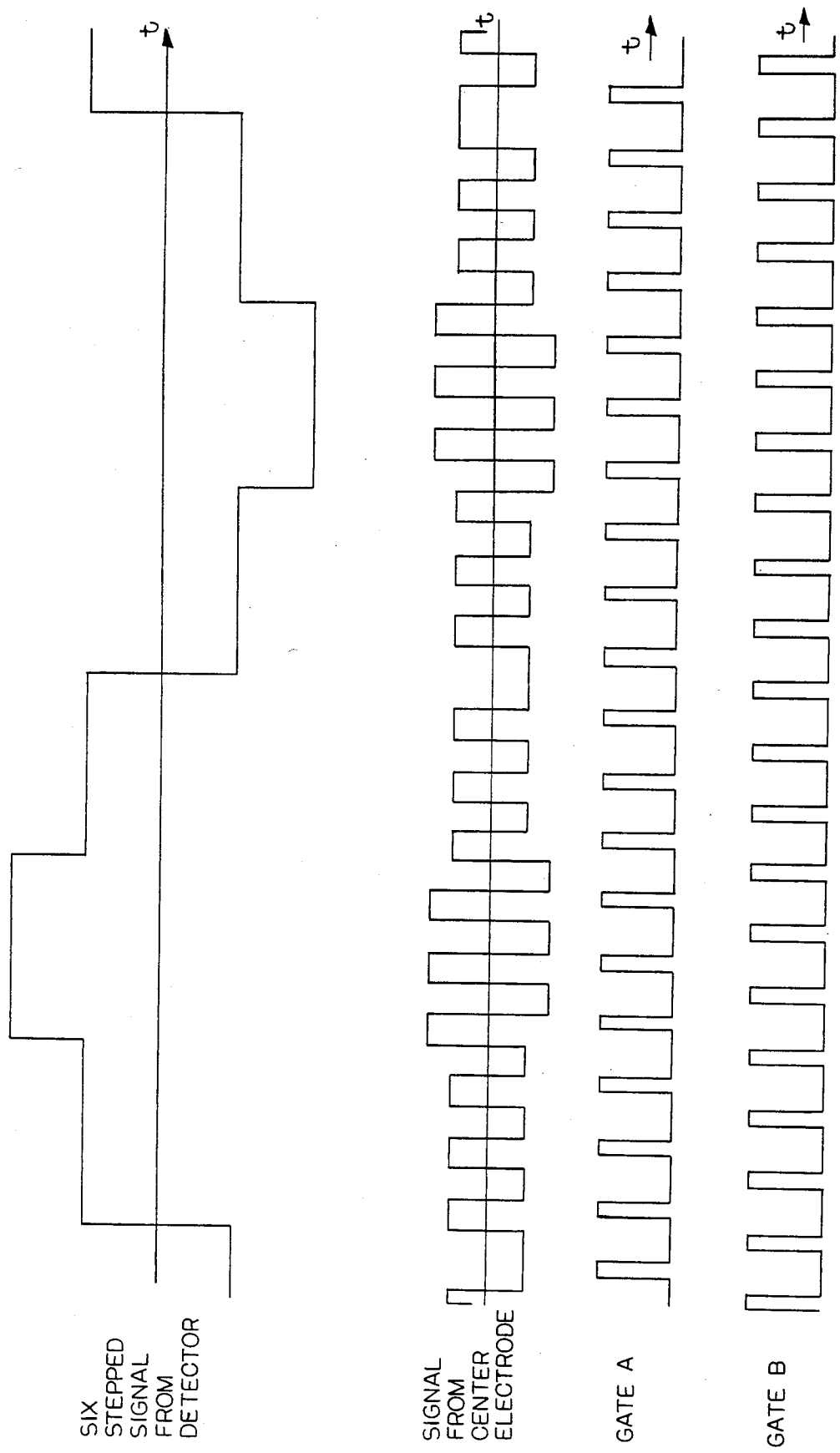

ARCTANGENT LOOKUP TABLE

| W | INTEGER | W | INTEGER |
|---|---|---|---|
| 0 | 1 | 40 | 108 |
| 1 | 4 | 41 | 110 |
| 2 | 6 | 42 | 113 |
| 3 | 9 | 43 | 116 |
| 4 | 11 | 44 | 120 |
| 5 | 14 | 45 | 123 |
| 6 | 16 | 46 | 126 |
| 7 | 19 | 47 | 129 |
| 8 | 21 | 48 | 132 |
| 9 | 24 | 49 | 135 |
| 10 | 26 | 50 | 138 |
| 11 | 29 | 51 | 142 |
| 12 | 32 | 52 | 145 |
| 13 | 34 | 53 | 148 |
| 14 | 37 | 54 | 152 |
| 15 | 39 | 55 | 155 |
| 16 | 42 | 56 | 159 |
| 17 | 44 | 57 | 162 |
| 18 | 47 | 58 | 166 |
| 19 | 50 | 59 | 169 |
| 20 | 52 | 60 | 173 |
| 21 | 55 | 61 | 177 |
| 22 | 57 | 62 | 180 |
| 23 | 60 | 63 | 184 |
| 24 | 63 | 64 | 188 |
| 25 | 65 | 65 | 192 |
| 26 | 68 | 66 | 196 |
| 27 | 71 | 67 | 200 |
| 28 | 74 | 68 | 204 |
| 29 | 76 | 69 | 208 |
| 30 | 79 | 70 | 212 |
| 31 | 82 | 71 | 216 |
| 32 | 85 | 72 | 221 |
| 33 | 87 | 73 | 225 |
| 34 | 90 | 74 | 230 |
| 35 | 93 | 75 | 234 |
| 36 | 96 | 76 | 239 |
| 37 | 99 | 77 | 244 |
| 38 | 102 | 78 | 249 |
| 39 | 105 | 79 | 253 |

FIG. 11

AMPLITUDE COMPENSATION LOOK-UP TABLE

| W | RS | W | RS |
|---|---|---|---|
| 144 | 99 | 168 | 2037 |
| 146 | 116 | 170 | 2648 |
| 148 | 138 | 172 | 3930 |
| 150 | 166 | 174 | 5318 |
| 152 | 203 | 176 | 7042 |
| 154 | 253 | 178 | 9121 |
| 156 | 321 | 180 | 11568 |
| 158 | 417 | 182 | 14390 |
| 160 | 553 | 184 | 17595 |
| 162 | 750 | 186 | 21185 |
| 164 | 1036 | 188 | 25163 |
| 166 | 1449 | | |

FIG. 11C

INTERDIAL COMPENSATION TECHNIQUE FOR ANGULAR POSITION DETECTORS

This application is a division of application Ser. No. 516,714, filed on U.S. Pat. No. 4,606,008 filed 7-25-83.

BACKGROUND OF THE INVENTION

In commercial, industrial and domestic applications it is often useful to determine quickly the position, speed or direction of rotation of a movable body such as a meter hand, a robot arm, or perhaps an abnormality in a plate of dielectric material. For an example of the former, various means have been developed for determining the position of the dial hands of utility meters so as to permit them to be read rapidly and automatically from a remote location. In contrast with conventional practice in which a utility company employee periodically visits each meter to obtain a visual reading, remote meter reading offers very significant economic benefits. By suitable means, for example, all the meters in a large apartment complex can be read in a few seconds from a single location outside the building or in the basement; or meters can be read several times daily to allow the utility to obtain energy flow data, study consumption patterns, or (by the use of time-of-day rates) discourage consumption during periods of high demand.

Clearly, in such a reading means a highly desirable feature is the ability to read ordinary utility meters which are already in service. Nonetheless, with the exception of previous work by and on behalf of the assignee of this application, remote meter dial reading has been generally possible only through the use of expensive specially-equipped meters which replaced the ordinary meter already in use. The above-mentioned previous efforts by and on the part of the assignee have resulted in meter-reading systems disclosed in U.S. Pat. Nos. 3,500,365, 4,433,332 and 4,007,454; and in U.S. patent application Ser. No. 375,919, filed May 7, 1982 and now abandoned. In each of these patents and applications, in general, a sensing transducer scans the dials of the meter by inducing an electric or magnetic field which includes the hands. The theory of the aforementioned patents and applications is that the transducer's field can be coupled to the meter hand through the intervening space, and variations in the phase of the resultant signal detected give an indication of the meter hand's position. Because no mechanical parts that move relative to one another are used, potential problems of maintenance and reliability are eliminated.

Improvements to the devices disclosed in the above-mentioned patents and applications are also disclosed in U.S. Pat. No. 4,429,308 assigned to the assignee of this application. This application is directed to a peculiar shape of the field-producing electrode which provides improved uniformity of angular sensitivity. Also, a further improvement is disclosed in U.S. Pat. No. 4,214,152, issued July 22, 1980, which involves a technique for compensation for the mechanical misalignment of one of a plurality of meter hands by adjusting the reading of a more significant hand responsive to the hand position of the adjacent lesser significant integer.

SUMMARY OF THE PRESENT INVENTION

The present invention is also directed to a method and apparatus for detecting the presence and/or position of objects causing a disturbance to the field of such a phase-sensitive transducer, wherein the transducer is a prescribed circular array of electrodes (or in the magnetic approach, a circular array of pole pieces). While the present invention may be adapted to other applications such as the determination of the position of the arm of a robot or the location of openings or flaws in a planar workpiece, for the most part the invention will be described herein as being utilized for the determination of the position of a meter hand, keeping in mind that the techniques of the invention are equally applicable to other areas.

In contrast with conventional phase-measuring techniques, typically concerned with directly-measured timing relationships between sinusoidal signal waveforms, one aspect of the present invention permits a more accurate determination of phase and hence of hand angle, from the measured amplitude ratios of a plurality of periodic, stepwise signal levels. Stepwise levels arise from the use of certain properties of square waves by a novel field-excitation approach utilized in this invention. By these means it has been found possible to simplify manufacture and eliminate errors which are often introduced by waveshape imperfections in earlier, sinusoidally-driven models of the transducer described above. Further, according to a second aspect of the invention there is provided an accurate calculation of the quality of the phase-related signal from the amplitude relationships between periodic, stepwise signal levels without the necessity for difficult measurements of complex, continuously-varying waveshapes. Moreover, and in accordance with a third aspect, the present invention allows rapid compensation for the effect of varying distance between the transducer and the hand, increasing the span of distances over which the transducer can be satisfactorily operated, reducing its cost, and simplifying its installation on the meter. Further, the present invention employs a novel technique for converting the numerical results of the transducer's reading process into standard ASCII code: this aspect of the invention accomplishes the desired conversion faster and with less computational hardware than is otherwise possible.

To correct or compensate for the possible misalignment of certain hands or dials, the present invention introduces a technique whereby the least significant dial is read first and then a compensating offset value is generated for the next dial. For each reading of a dial after the first, there is automatically added a correction factor to the apparent value of the indicator being read which is based on a cumulative correction factor from the previously adjusted values of all lesser significant indicators. The compensation value is continuously adjusted responsive to the reading from the lesser significant dials, so that the adjusted reading from any selected more significant dial will tend to fall exactly halfway between two adjacent integers. The compensation adjustment continues from each less significant dial to the next more significant dial as a cumulative adjustment factor, so that when the reading is completed, errors due to mechanical misalignment should be eliminated.

As previously stated the phase angle of the hand position is converted to a binary representation thereof. In accordance with the present invention the conversion is effected by utilizing binary coded integers whose range is so selected as to facilitate calculations and compensations and to provide a resulting value that readily converts to the BCD of the integer value of the hand position. The key to this special range is that the circle is first broken into 640 parts. That means that each quadrant includes 160 parts and each half-quadrant has 80 parts. These are important considerations in determining the arctangent of the phase angles of the hand, which will be converted to a number between zero and 639.

BRIEF DESCRIPTION OF THE DRAWINGS

FIG. 6a is illustrative of the signal received from the central node and its subsequent synchronous detection;

FIG. 11 is the arctangent lookup table;

FIG. 11c is the amplitude compensation lookup table;

DETAILED DESCRIPTION OF THE PREFERRED EMBODIMENT

Figure 1:
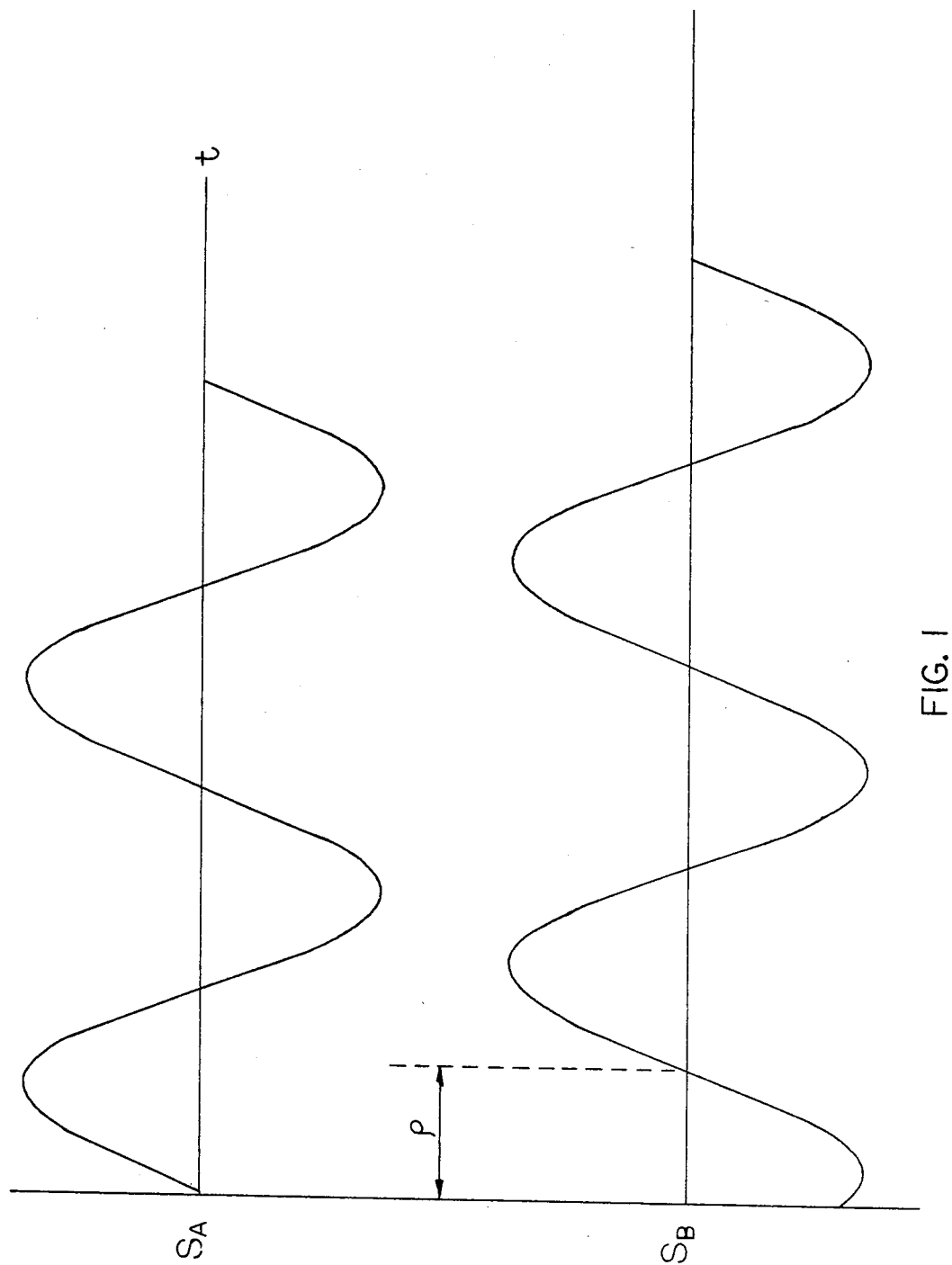
FIG. 1 is a timing diagram of a pair of phase shifted drives.

The present invention is directed to a transducer system which utilizes a set (six) of phase-modulated electrical drives and a double-sided synchronous detection system to detect the position of an object having electrical characteristics which differ from the characteristics of the surrounding medium, as for example, the position of a meter hand. Phase, of course, is the temporal relationship of two periodic phenomena, such as electrical signals in the present invention. Phase is measured in terms of a portion of a complete cycle of one of the signals. Thus, one cycle equals 360° or $2\pi$ radians. In order to measure time differences or phase, some standard point or landmark must be used. Since the signals may be square waves, as well as sine waves, the peaks are not generally used as the landmark. Rather, a conventional technique which has developed for measuring phase relationship is to utilize the positive-going zero crossing point, with zero defined as a level midway between the high and low extremes (FIG. 1). This is referred to as the "zero crossing technique" and is well known. Another known technique for generating a phase landmark is the "phase locked loop" technique.

Figure 2:
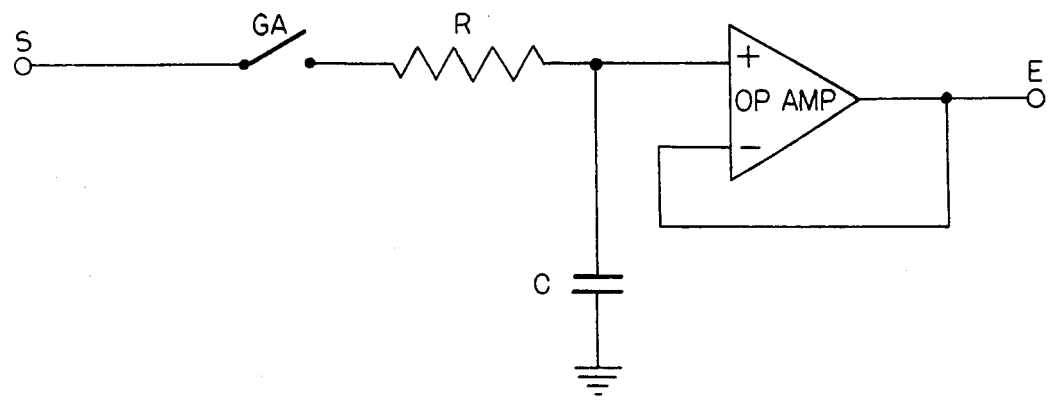
FIG. 2 is a schematic representation of a simple conventional single-sided detector circuit which could be used with the present invention.

By way of background leading up to a discussion of the present invention a phase demodulation system will be outlined. Assume that A is a reference gating pulse, which synchronously gates or generates samples from another periodic signal S for some period, $\Delta T$. The mean level then of the sampled signal is a function of the phase angle, $\theta$, between the two signals, although not unambiguously so. A simple single-sided sample and hold circuit for performing this task is shown in FIG. 2.

Figure 3:
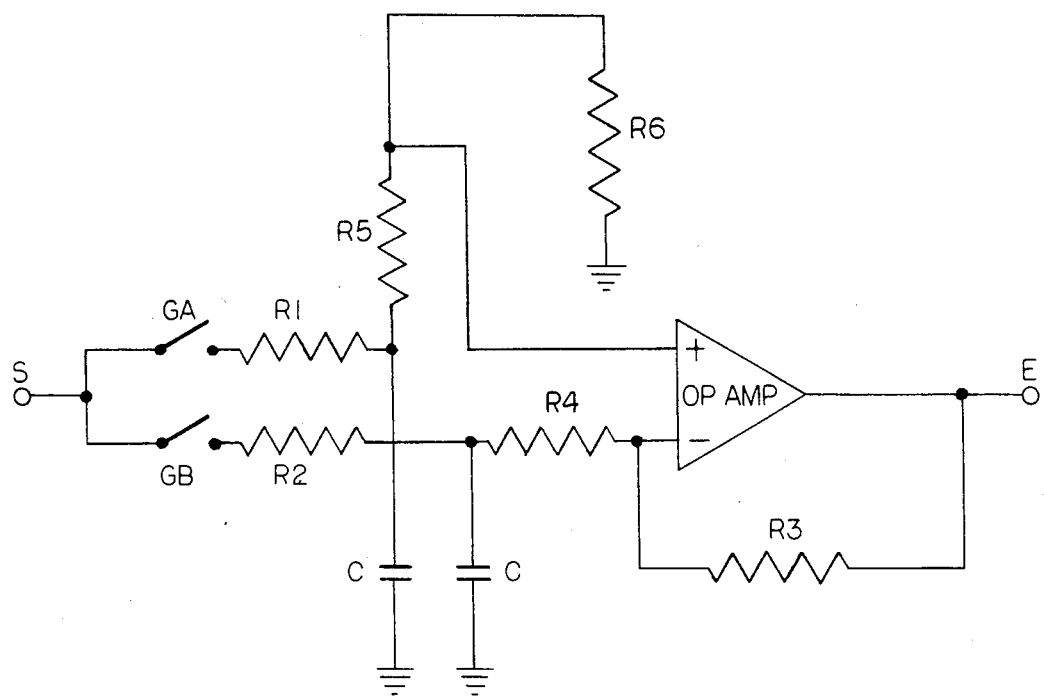
FIG. 3 is a schematic representation of a more reliable double-sided differential detector circuit used for synchronously detecting the output signal from the transducer plate.

Obviously, some information will be lost in that only a brief portion of the signal is sampled. A second synchronous gating pulse B can be generated 180° delayed from the gate pulse A. If a signal S is sampled again with pulse B, and the resultant signal is inverted and added to resultant signal generated by pulse A, then there results a "differential detection system" which achieves two ends: (a) the effective signal is doubled; and (b) shifts in the DC or low frequency level of the signal are cancelled out, producing a more reliable signal (E) with consequent rejection of a common DC or low level component (this is termed "common mode rejection"). The circuit for producing such a differential detection signal is outlined in FIG. 3. This circuit also amplifies the resulting signal.

Figure 4:
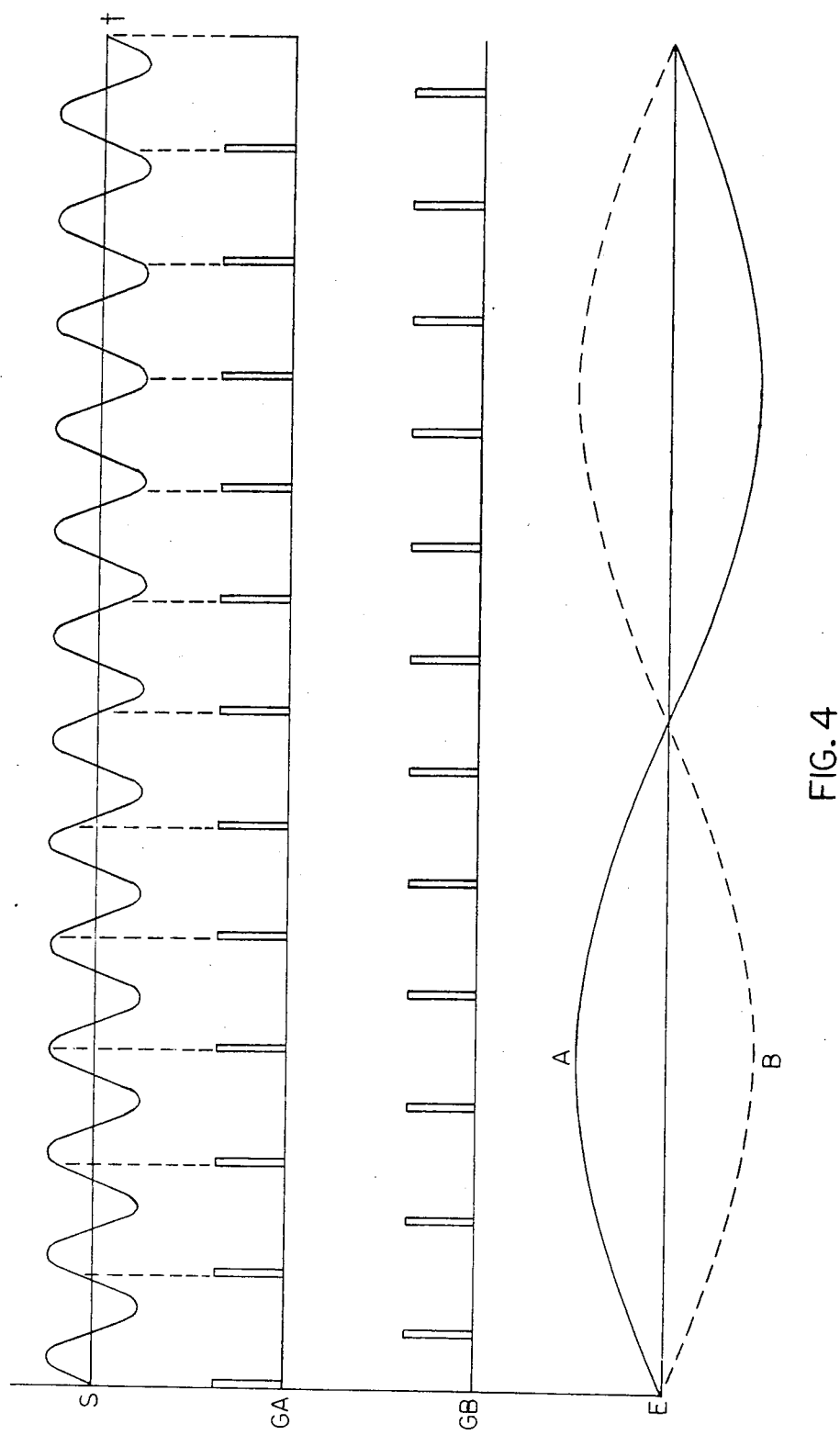
FIG. 4 is a timing diagram representation of a single sine wave drive synchronously detected by a pair of sampling gates.

Thus, where there is a signal S sampled by gating pulse GA, and the phase difference between the signals and the gating pulse GA changes smoothly, then the sampling window moves smoothly through the entire cycle of the signal, tracing out the signal at an expanded time scale (FIG. 4). This may be thought of as a beat frequency, $f_E$, determined as: $f_E = (f_{GA} - f_S)$. This holds true for both single- and double-sided sampling cases. If $f_{GA}$ and $f_S$ are known, then $f_E$ is also well known. If signals GA and S both commence with a certain phase relationship, they will return to that phase relationship after a calculable number of cycles according to the following equation:

$$(f_{GA}/f_{GA} - f_S) = \# \text{ cycles of GA}$$

A new "supra" time period is thus defined (FIG. 4), which is required for $\theta$ (the phase relationship between GA and S) to cycle $2\pi$ radians. Again, the signal E is related to the phase $\theta$ between signals S and GA. Therefore, if a reference signal R with a period of $T_R=(1/f_{GA}-f_S)$ exists, a new phase angle $\phi$ can be defined as the relative phase of S (relative to GA) and R (relative to E). Since $\theta$ is the phase of S with respect to GA, then $\phi$ is related to $\theta$ in such a manner that is $\theta$ is determined as the zero-crossing of R, then $\phi=\theta$ (it should be kept in mind that $\phi$ is the phase angle of the phase of E at the zero-crossing of R).

A periodic signal, $S_A$, can be generated (FIG. 1). A second signal, $S_B$, is generated which has the same frequency as $S_A$, but is phase shifted $\rho$ with respect to it (see FIG. 1). If a signal is detected which may be either $S_A$ or $S_B$, then it can be determined which signal it is by examining $\phi$ with respect to the reference signal. If $\phi=0$, the signal is $S_A$. On the other hand if $\phi=\rho$, then the signal is $S_B$. Mathematically if two sine waves are added together, a single sine wave results defined by the following equation:

$$C \sin(\omega t+\psi)=A \sin(\omega t)+B \sin(\omega t+\rho).$$

The addition in the above equation is of a vectorial nature. The important consideration is that a single sine wave with a phase angle of $\psi$ results. The angle $\psi$ is a function of $\rho$ and the ratio of A to B. If $\rho$ is known (i.e. fixed), the $\rho$ is a function of the ratio of A to B (vector addition). Therefore, if $\psi$ can be measured, then there results a measure of the ratio of A to B.

If one has a system which differentially couples $S_A$ and $S_B$ according to the position of some object (meter hand), then the position of the object can be determined from $\psi$. The situation with two signals with different phases can be expanded to include more than two phases. Thus, if the signal phases are arranged in an orderly and predictable manner, three drivers can be used unambiguously to determine the position of a rotatable hand. If three equal-amplitude sine wave signals were equally spaced over $2\pi$ radians at $2\pi/3$ intervals, when summed, the vector sum is zero. The above analysis is conventional and should be used as background for the present invention, a description of which ensues.

Drive Signals of the Present Invention

Figure 5:
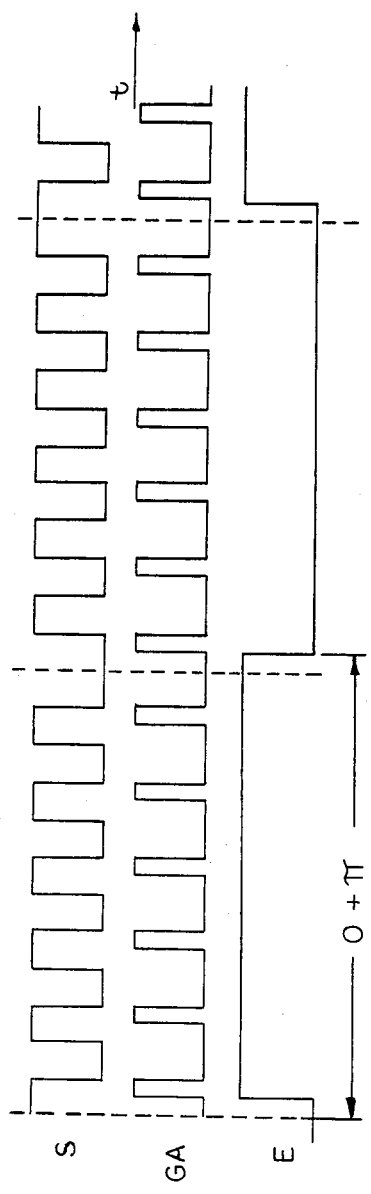
FIG. 5 is a timing diagram representative of a square wave drive signal as used in the present invention demodulated by a single gate resulting in a simple square wave.

The present invention uses a phase modulation/-demodulation technique to generate a resultant signal which is the superposition of a set of square waves. The drive signals are not sine waves, but are phase modulated square waves with two levels, $V_{DD}$ and $V_{SS}$. Only two phase conditions of the carrier signal of each of the drives are used. The drive signals have two possible phase transition points: 0 and $\pi$ radians (0° and 180°). Each drive has a 50% phase cycle ($\frac{1}{2}T$ at 0 and $\frac{1}{2}T$ at $\pi$). A single drive S synchronously demodulated by a single gate GA results in a simple square wave E (FIG. 5).

By driving square waves which have only two phases 180° apart, the gate can have a long sample period. The gate is not closed until all transients have died out or been suppressed. Thus the concept is well suited to digital implementation.

Figure 5A:
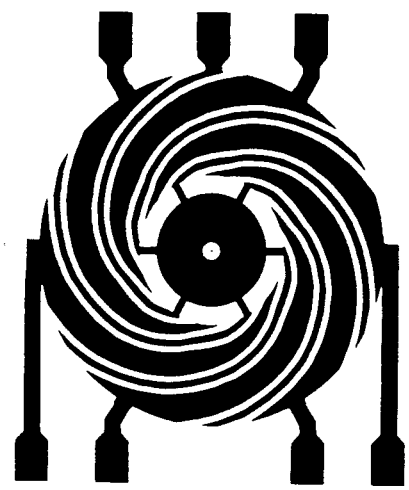
FIG. 5a is a plan view of the electrode arrangement contemplated by the present invention.

In the present invention, there is utilized drive pairs consisting of driver signals and their complements. Three such pairs of signals are used. One pair (A, $\overline{A}$) phase transitions at 0 with respect to a reference signal. Drive signal A assumes what is arbitrarily termed the 0-phase condition at 0. A second phase pair (B, $\overline{B}$) transitions at $2\pi/3$ (120°) with respect to the reference signal. A third phase pair (C, $\overline{C}$) transitions at $4\pi/3$ (240°). The above are referred to as phase modulated drive signals. The driver array electrodes are physically arranged (FIG. 5a) at such angular positions which correspond or correlate with the phase of their phase shift with respect to the reference signal. Thus:

| DRIVE | TRANSITION OR PHASE ANGLE | PHYSICAL ANGLE OF ELECTRODES | |
|---|---|---|---|
| | | RADIANS | DEGREES |
| A | 0 | 0 | 0° |
| $\overline{C}$ | $\frac{1}{3}\pi$ | $\frac{1}{3}\pi$ | 60° |
| B | $\frac{2}{3}\pi$ | $\frac{2}{3}\pi$ | 120° |
| $\overline{A}$ | $\pi$ | $\pi$ | 180° |
| C | $4/3\pi$ | $4/3\pi$ | 240° |
| $\overline{B}$ | $5/3\pi$ | $5/3\pi$ | 300° |

Figure 6:
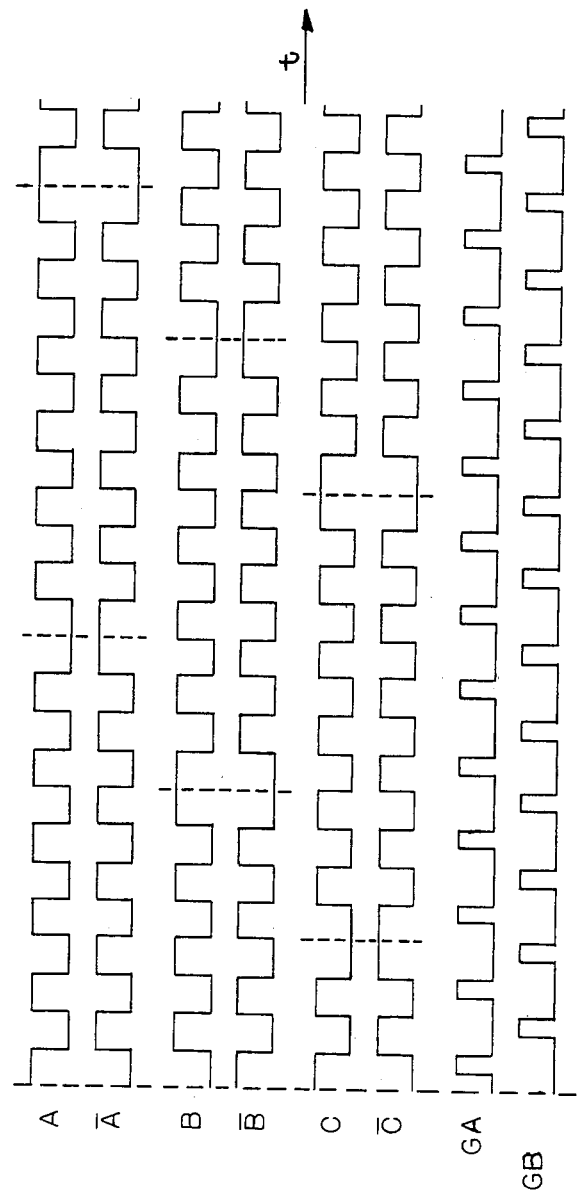
FIG. 6 is a timing diagram representative of the relation of the drive signal pairs according to the present invention.

This arrangement is also shown in FIG. 6.

Figure 11A:
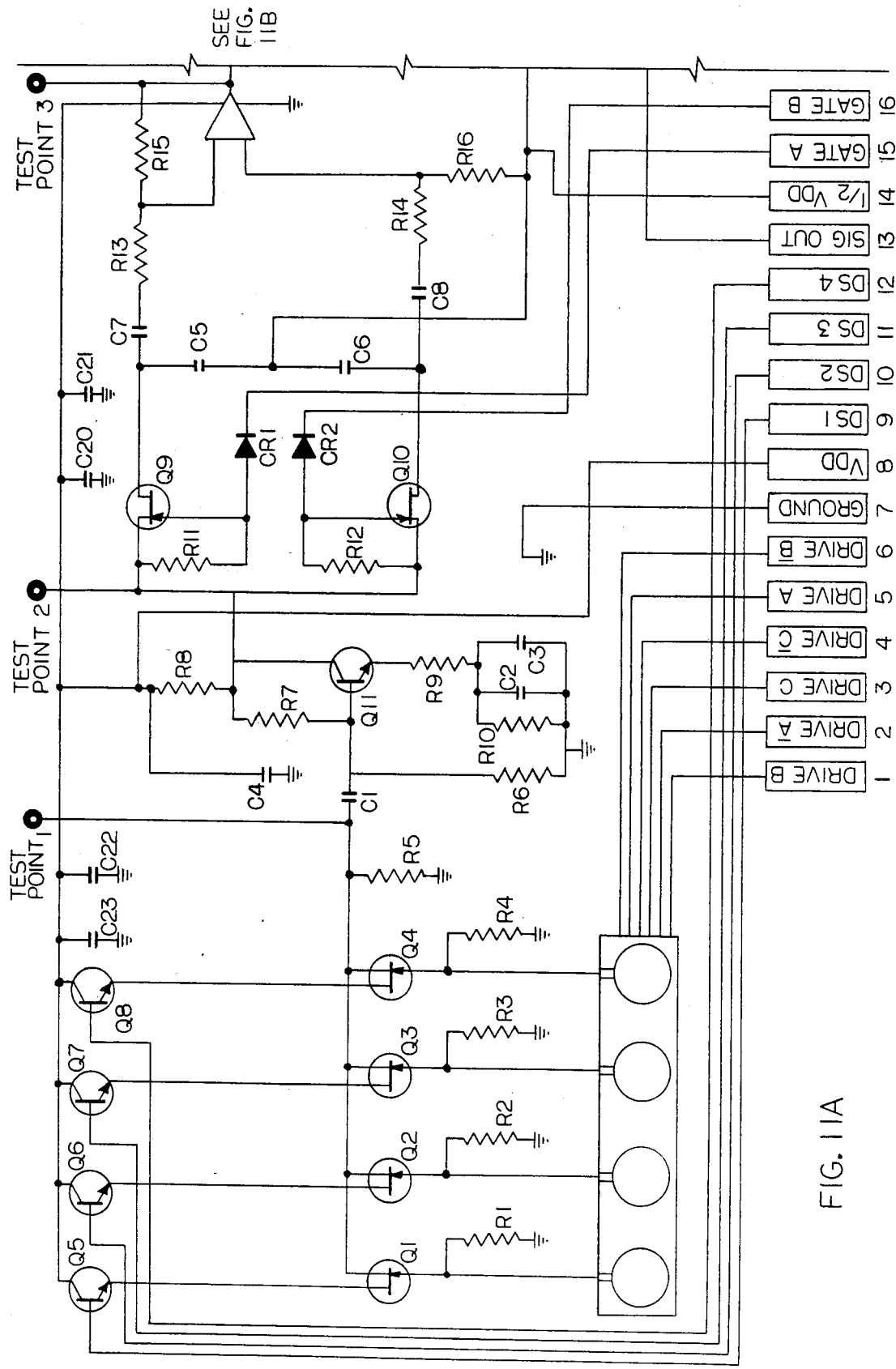
FIGS. 11a and 11b together form an electrical schematic of the circuit for amplifying and synchronously demodulating the signal from the transducer plate central node.
Figure 11B:
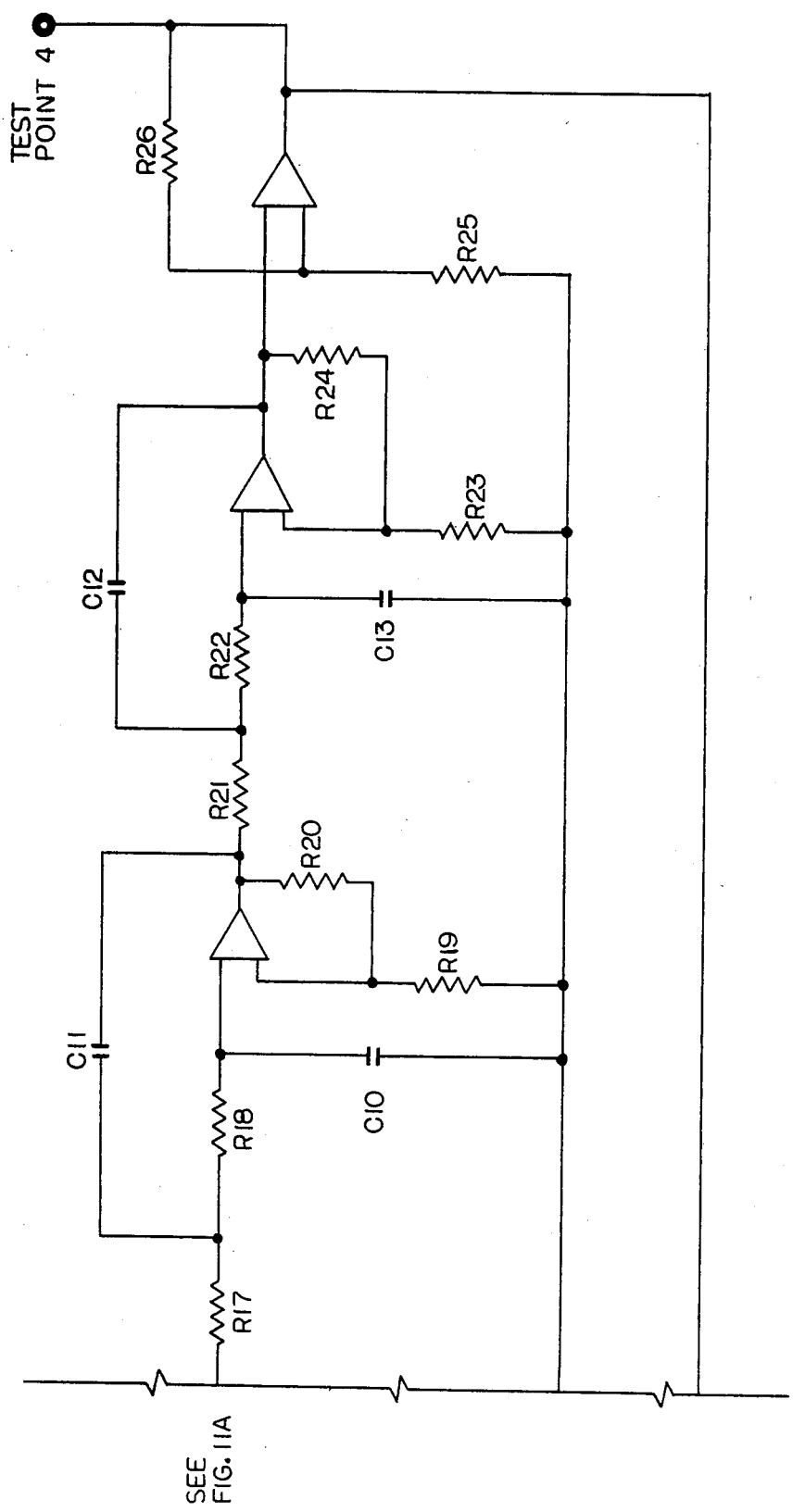
Figure 12:
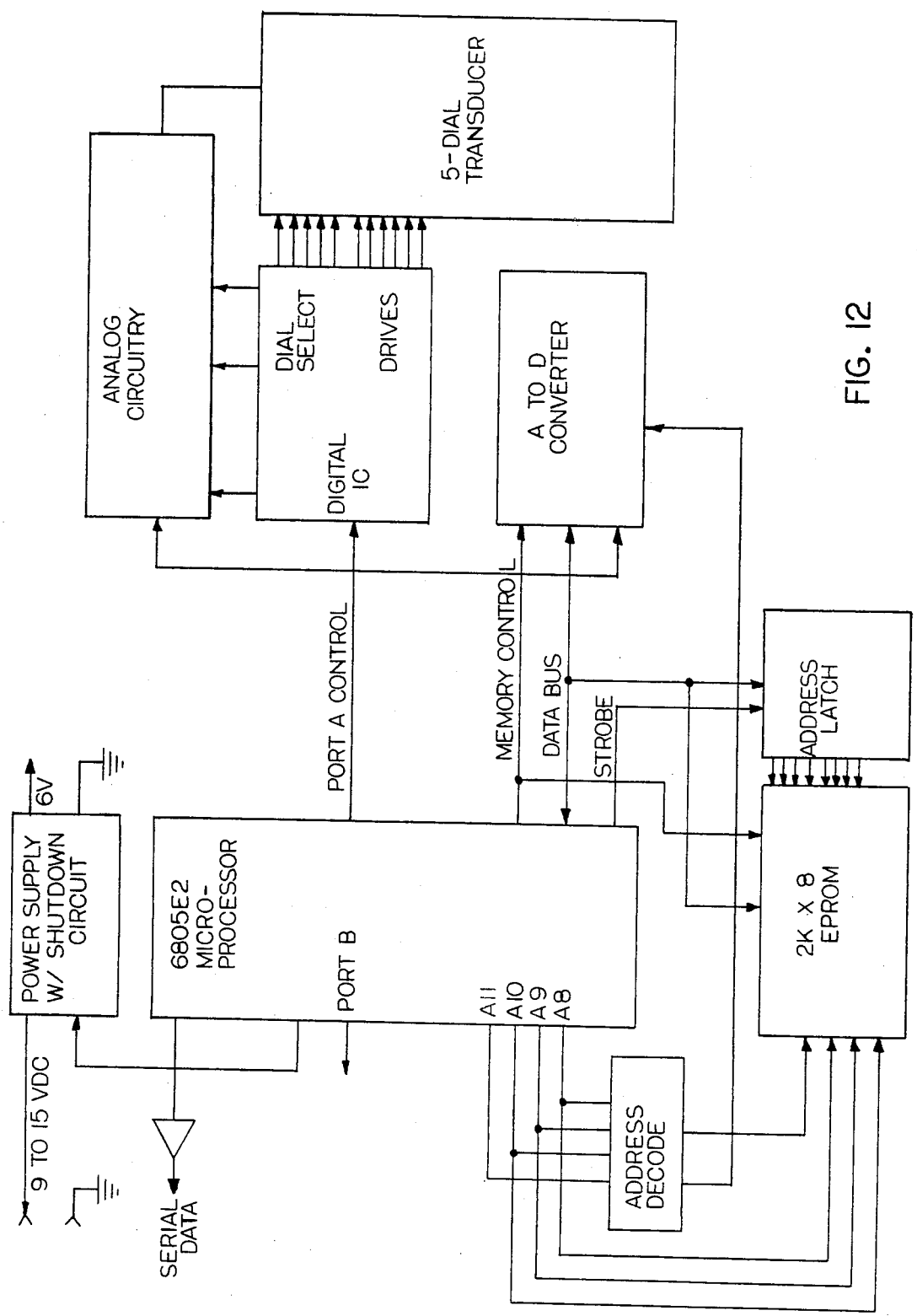
FIG. 12 is a major block diagram of the system of the present invention.
Figure 13:
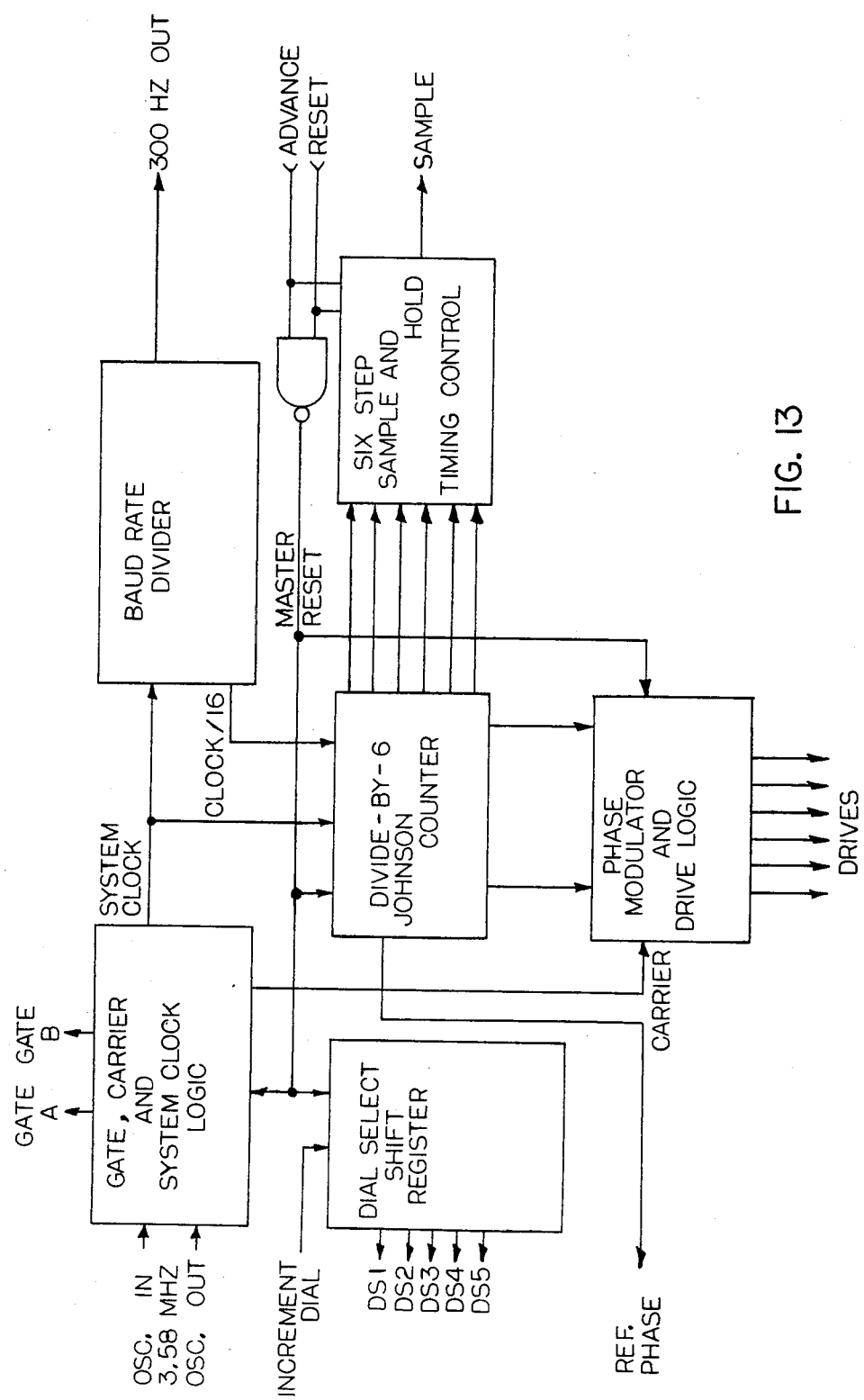
FIG. 13 is a functional block diagram of the generation of the drive and sample signals.
Figure 14:
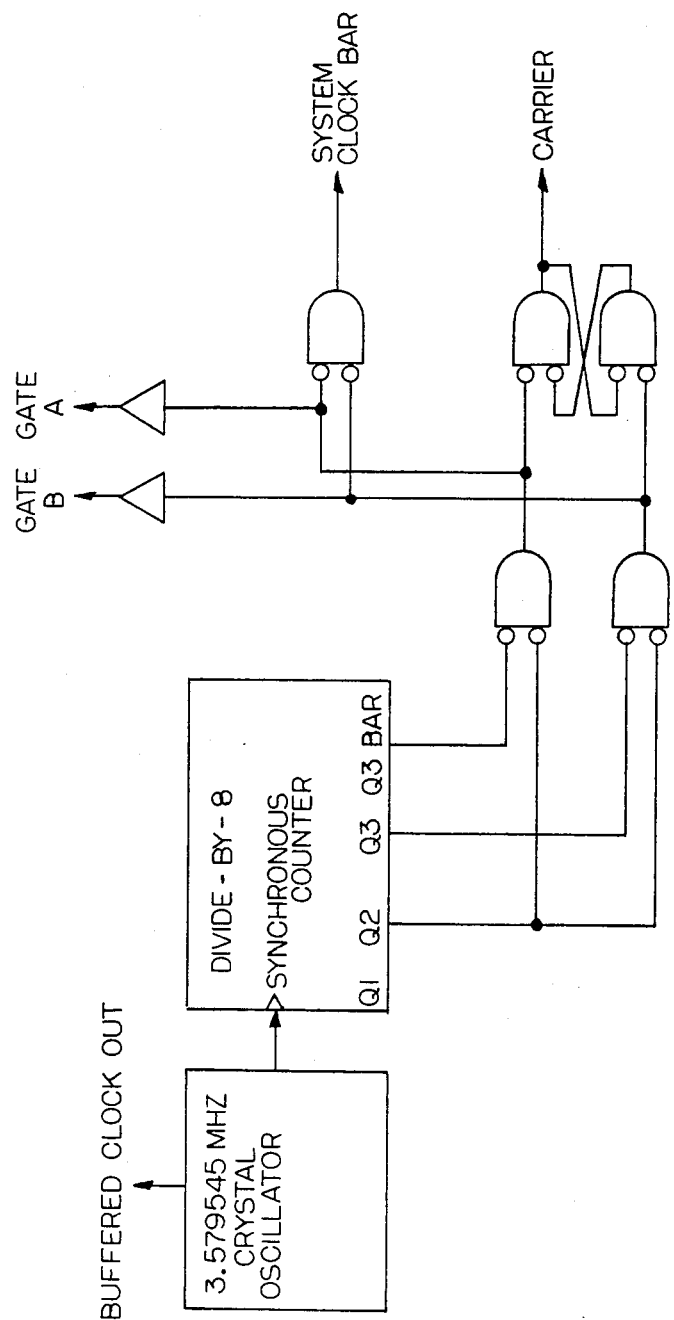
FIG. 14 is a block diagram of the gates, carrier and system clock generator circuit.
Figure 15:
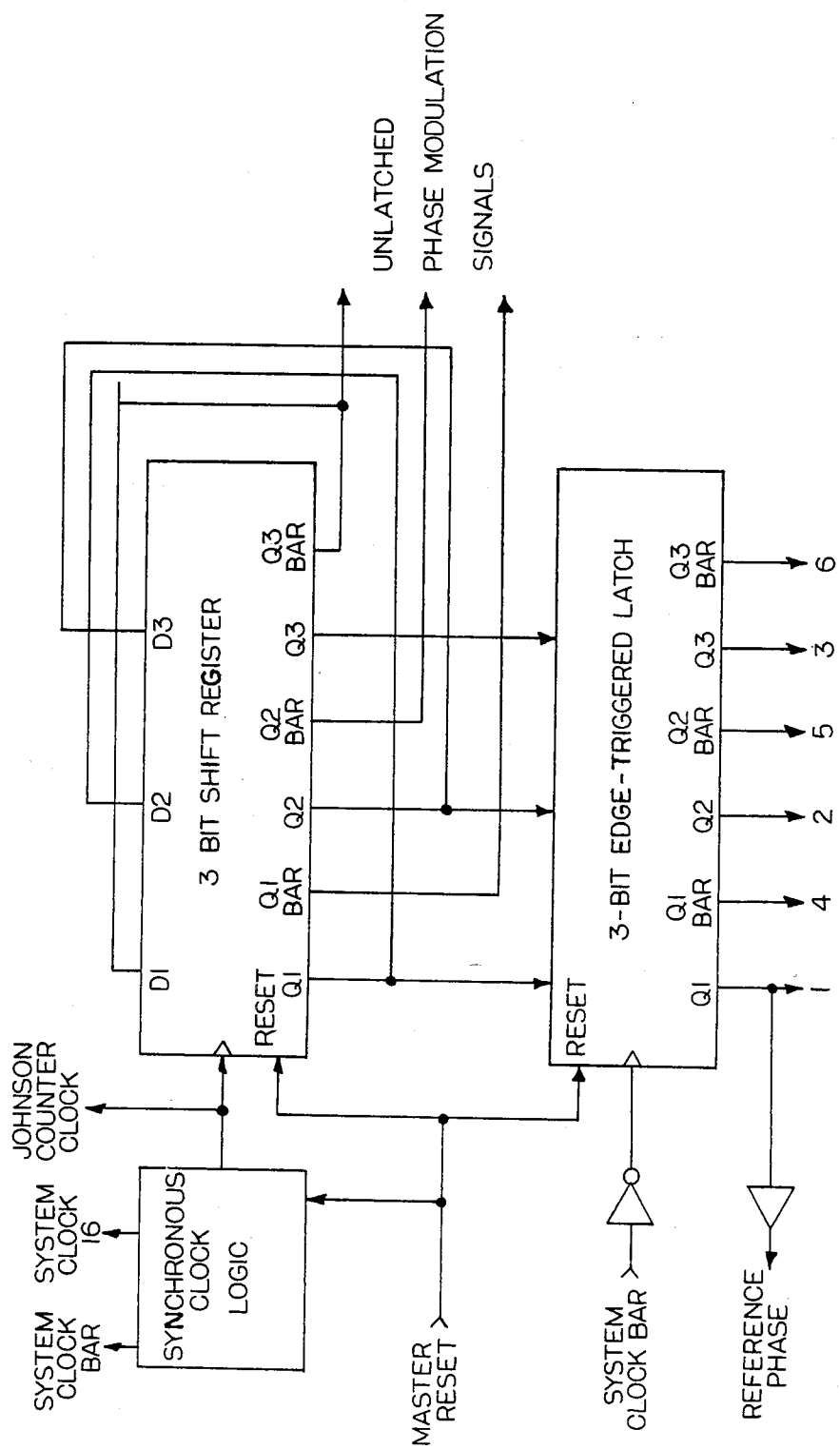
FIG. 15 is a block diagram of the phase modulation signal generation portion of the system.
Figure 16:
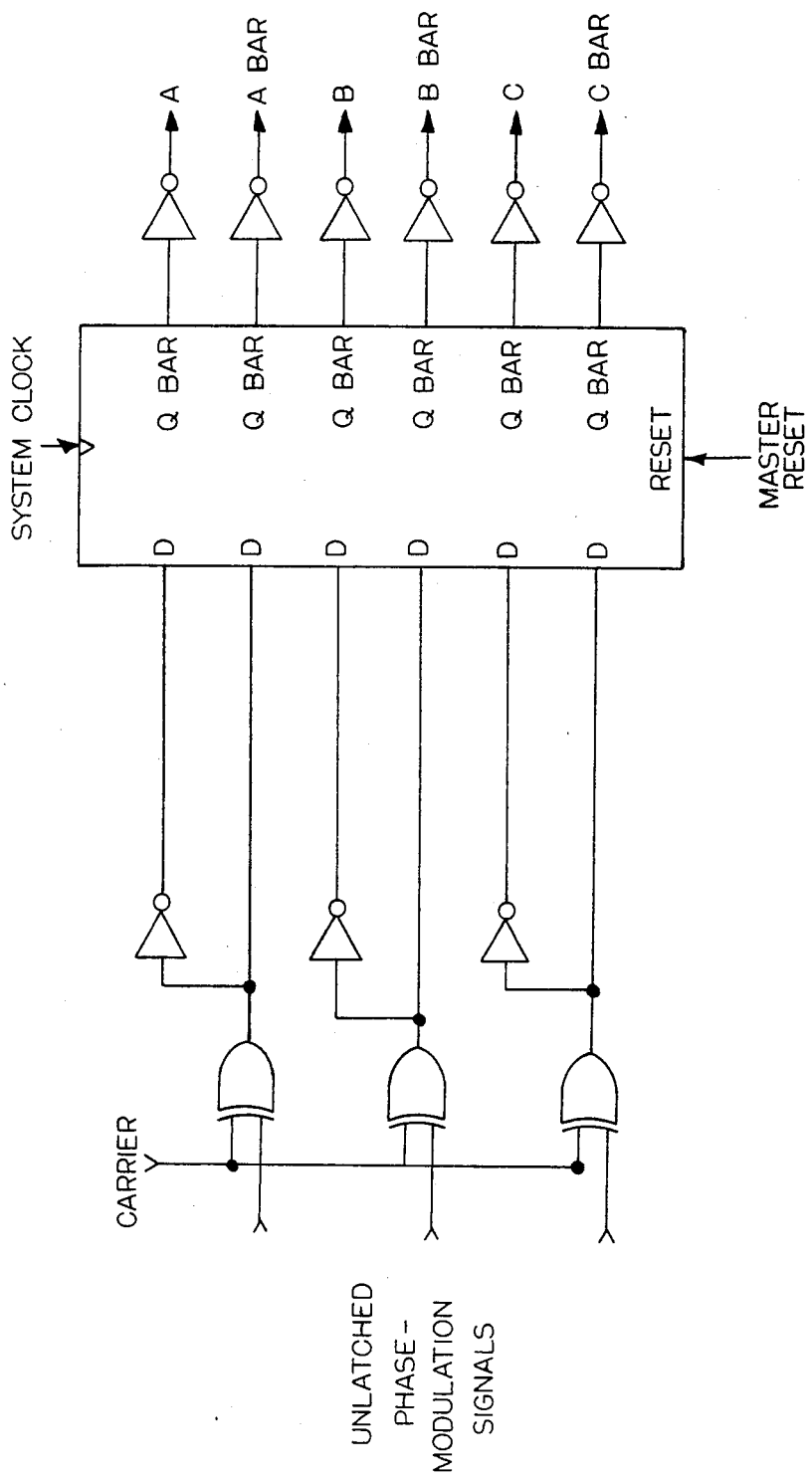
FIG. 16 is a block diagram of the phase modulator and transducer drive logic portion of the system.
Figure 17:
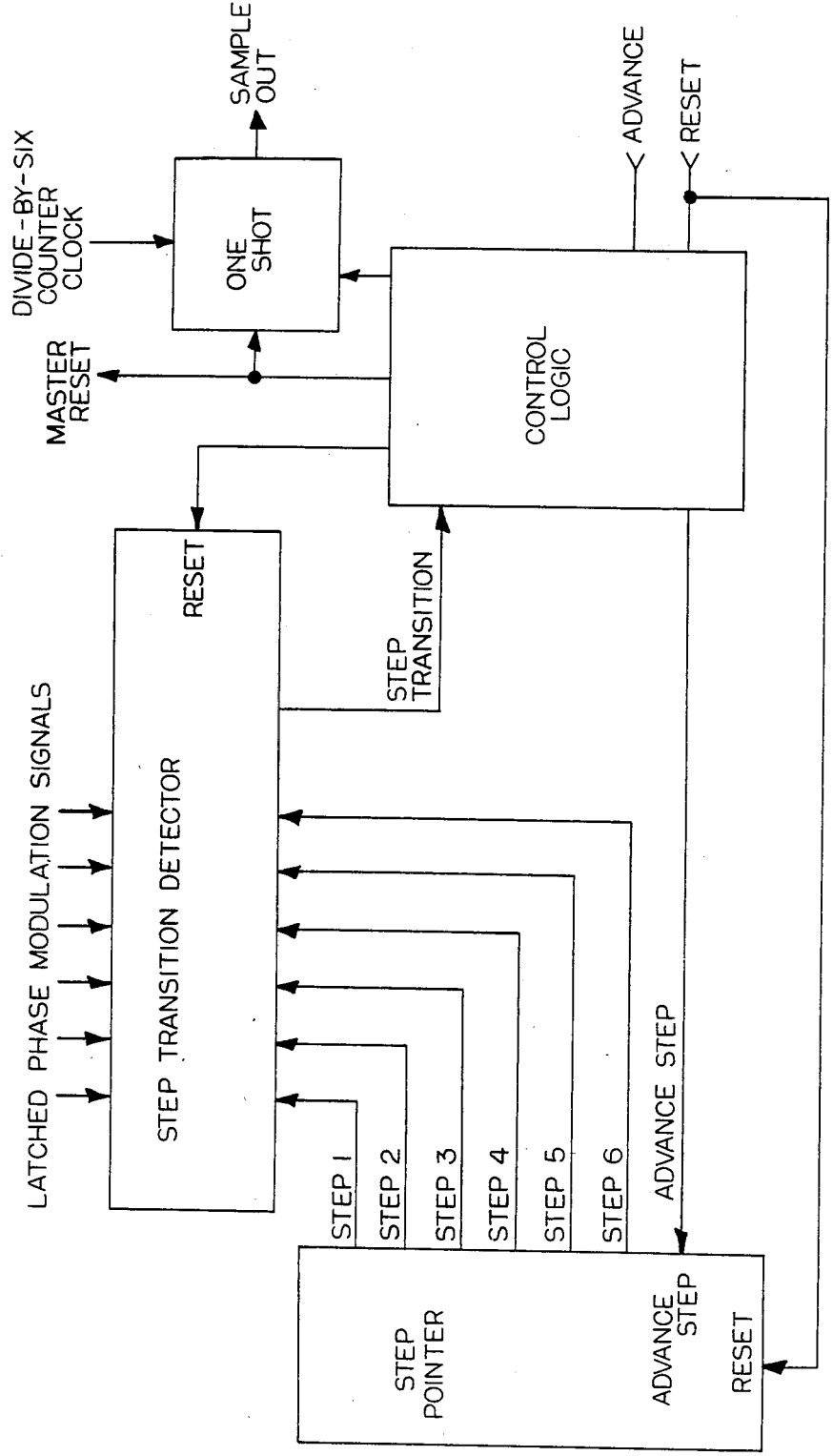
FIG. 17 is a block diagram of the sample and hold logic for synchronously sampling the steps of the demodulated signal.
Figure 18:
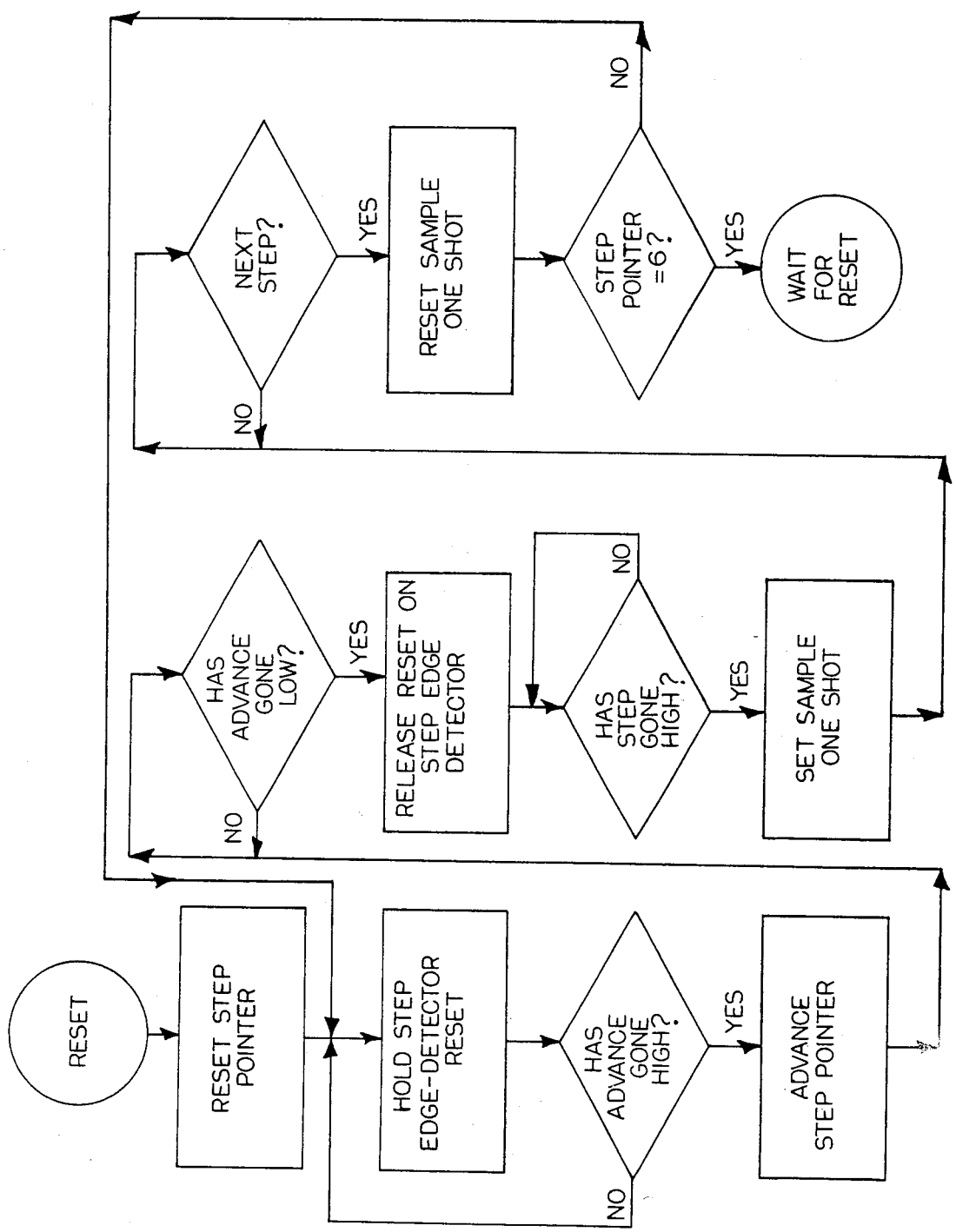
FIG. 18 is a program flow chart interfacing the sample and hold digital logic with the central processing unit.
Figures 19, 20:
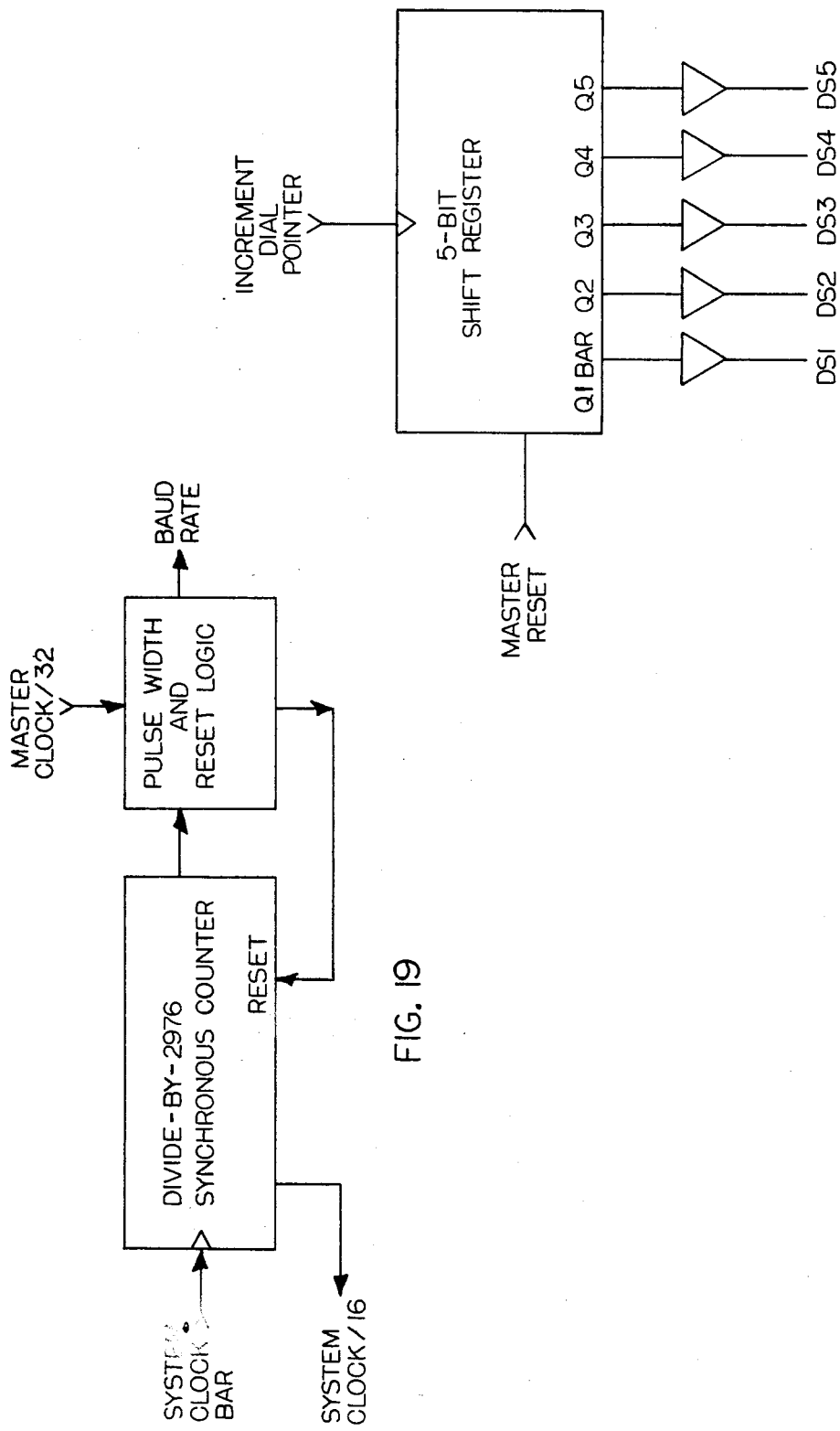
FIG. 19 is a block diagram of the baud rate generator.
FIG. 20 is a block diagram of the 5-bit shift register which controls the dial-enable function.

In such arrangement in the absence of a hand or other dielectric variance, all phase pairs should balance, and there should be no signal on the center node or center electrode. The presence of a meter hand unbalances the coupling of the drives to the center electrode. If only signals A, B, and C and not their complements were present in the two-phase square wave condition, a non-zero signal would result. The output signal on the center electrode is strangely shaped (FIG. 6a). However, once it is buffered and synchronously detected as described in FIGS. 11a & 11b, the resulting signal has six steps which always occur at the same places, although the levels will change as the position of the hand changes (See FIG. 7). From FIG. 6 it is seen that there are six different phase conditions, thus the "six step output." Each step, however, does not correspond to one of the six electrodes. Note that steps 1 and 2 are not adjacent but are symmetrically offset from the horizontal center line. It is the nature of such a periodic function that, in the absence of any perturbing factors, each step will have its symmetrical partner. The steps (FIG. 7) have been numbered to show this fact. The actual step levels will, of course, vary according to the actual position of the hand in front of the array.

Once the six-step signal has been generated, there are several methods of determining the hand angle. The signal can be filtered to a sine wave and the zero-crossing detected, as described hereinabove. If a counter is started at $\theta=0$ and turned off by the zero-crossing detector, the count value is related to the phase angle. Similarly (and perhaps more reliably) a phase-locked loop can produce a square wave whose zero-crossing is closely related (offset by $\pi/2$) to the signal phase. This signal can be used to stop a counter as with the zero-crossing detectors. While either of the above types of detector may be used, it is preferred that the phase angle be calculated directly from the six-step signal levels in accordance with the techniques described hereinbelow.

Calculation of Phase Angle

Figure 8:
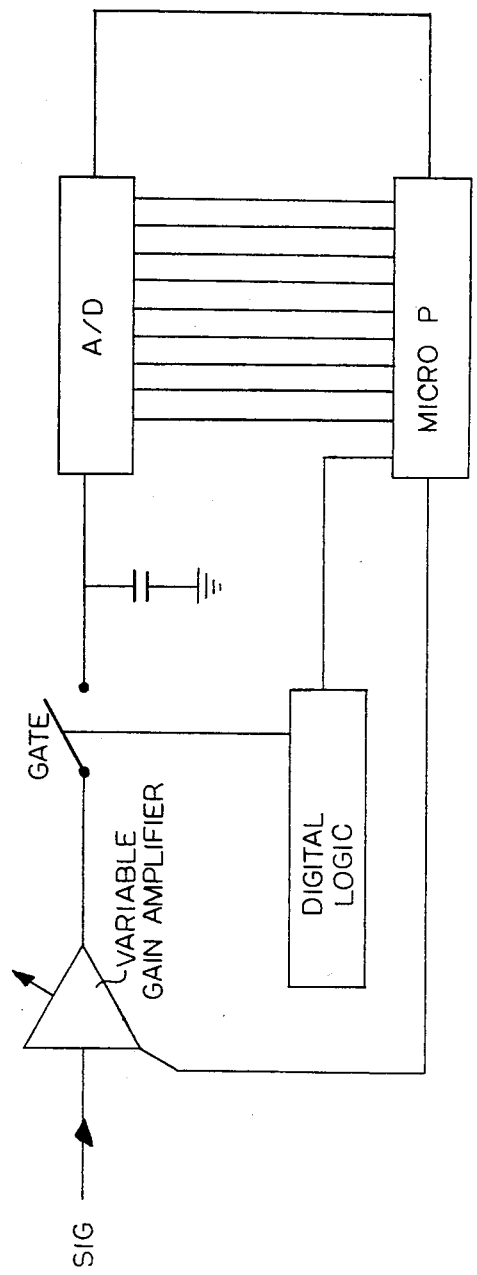
FIG. 8 is an electrical block diagram of the six step acquisition system.

The calculation of the phase angle of the signal directly from the six-step levels requires reading the step levels with an analog-to-digital converter and then performing an algorithm (FIG. 8). Contrary to the zero-crossing technique, this technique is not subject to component value changes. Additionally, the calculation method makes available a subsequent compensation based on the amplitude of the signal, which compensation will be related to the hand-to-transducer spacing. The calculation method is readily achieved with a microprocessor or microcomputer, although the method is compatible to a hardwired logic circuit.

The microprocessor must have some sort of data base representing the levels of the six steps, if it is to generate a hand position. In the system of the present invention, no negative voltages are used, although this is not a requirement. The signals have a center voltage of some value V, with the steps being either greater or less than V. In conjunction with the generation of the signal, there is utilized an 8-bit analog-to-digital converter to measure the levels and convert them into a digital representation in binary language. Due to the large variation in signal amplitude which results from the ordinary range of array-to-hand spacing, 10 bits of resolution is actually needed. To solve this problem there is utilized a variable gain prescaling amplifier in front of the step level acquisition circuit. (See FIG. 8). This amplifier can have a gain of 1, 2, 3, or 4, all under the control of the microprocessor. The system is designed so that the voltage level V is in the center of the A/D converter range (the 8-bit range is 0–255, so the center point is at 127), thus the signal is at V+ or − the step amplitude.

The step levels are acquired in the following sequence:
1. Gain is set to lowest level (1).
2. Levels are read in the order 1, 2, 3, 4, 5, 6.
3. Maximum and minimum levels are found (i.e. levels 3 and 4 in FIG. 7).
4. The gain (G) is set such that the signal is as large as possible without overflowing the A/D range.
5. The levels are reread in the same manner as step #2, above.

As stated above, and illustrated in FIG. 8, the levels are read into the microprocessor with an analog-to-digital converter. This device converts a voltage level into a binary code. An 8-bit A/D converter can resolve a voltage into one of 256 levels ($2^8$). As stated hereinabove, since 10-bit resolution is needed (1024 levels), the other 2 bits are generated with the variable gain preamplifier, which has an integer gain of from 1 to 4 ($2^2$) and is controlled by the microprocessor. The relationship of the signal acquisition elements is diagrammed in FIG. 8. The digital logic circuit controls the timing of the gate closing so that the proper six-step level is sampled at the proper time. The six steps are acquired in the order described hereinabove to have the maximum time available between samples to allow the A/D converter to perform its function and because the steps will be analyzed in pairs in the order taken into the A/D converter. After step 5 hereinabove, the six-step levels have been acquired in a digital form (binary code), and the gain being utilized has been stored. The same gain is used for all six steps. This is because the actual calculation of the hand position to follow is a function primarily of the ratios of the levels. The absolute amplitude is only critical in applying the amplitude compensation value, and does not require great precision. As this system is ratio based in most of the algoriths involved, while it required 10-bit resolution, only 8-bit accuracy is required. Thus, larger tolerances can be tolerated in the amplifier gain.

The microprocessor or embodiment of the algorithms has several reliability checks built thereinto. For example the algorithm checks the time required for the A/D converter to respond with data. If more than a specified amount of time is required, the microprocessor or algorithm presumes a fault condition and attempts to read the dial over. If there is a failure to respond the second time the system goes into a fault mode and does not attempt to read the dial in question or any subsequent dial. The algorithm also checks certain characteristics of the six-step levels. If the signal is too large (i.e. six-step levels which deviate too much from ±127.5), such signals will be too close to 0 or 255. This might cause the levels to be higher than the voltage which corresponds to 255, and then the A/D output would clip or limit, resulting in a "0" output. If the level is too low, the A/D output would tend to stay at 0. If the A/D level is too close to 0, then, the microprocessor presumes that the signal has either too high a voltage or too low a voltage, and it makes no difference which, as the result will be the same. The microprocessor steps through each of the stored six-step levels and checks to make sure that all are above some minimum value. If they are below that value, the entire set of values is rejected and the system attempts once again to read the six steps, going back through the gain setting part of the program. If the result is again faulty, the system presumes something is wrong and goes into the fault mode.

Each pair of steps (1 and 2, 3 and 4, 5 and 6) should be symmetrical about the center line. If they are not, it is presumed that some sort of noise got into the system or that there is a problem someplace in the electronic circuit. In either case, the signal is not acceptable. The symmetry of the step pairs is tested by summing the pairs together, which sum should equal 255. If the sum deviates from 255 by more than some specified amount the data is presumed to be faulty and the system tries to reread the steps. Again, if the second rereading fails, the system goes into the fault mode. The test is quite powerful and useful.

A test for too low a signal level is made later in the program during the amplitude compensation operation, as the signal level must be determined. If the signal is too low, the calculated hand position may be influenced by some residual or spurious signal and not due to the hand, so the system goes to the fault mode. These system checks do much to prevent a faulty reading from being transmitted.

Reduction to A, B, and C Vectors

Figure 9:
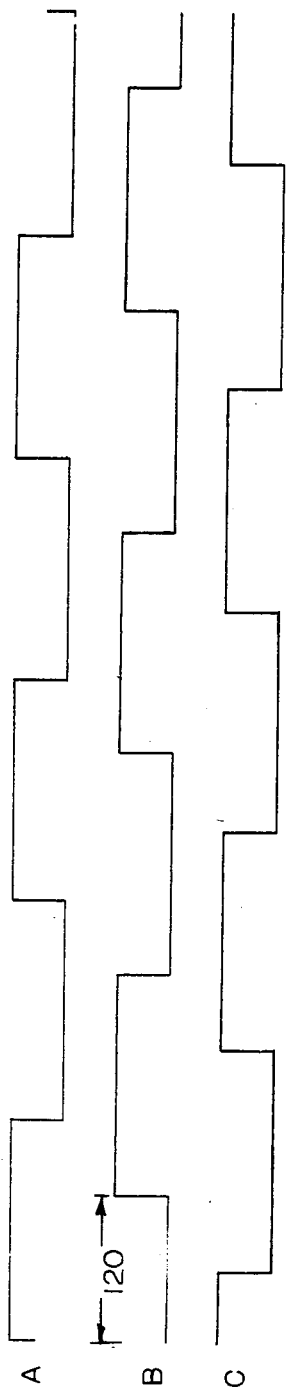
FIG. 9 is a diagrammatic representation of the detected signal separated into its three components.

As stated hereinabove, the six stepped signal at the central node is the superposition of three synchronously detected, square wave drive pair imbalances:

$A = (h_1 SA + h_2 \overline{SA})$
$B = (h_3 SB + h_4 \overline{SB})$
$C = (h_5 SC + h_6 \overline{SC})$ In the absence of a hand, we want A=B=C. Alternatively in the absence of a hand we want $h_1 = h_2$, $h_3 = h_4$, and $h_5 = h_6$ as $h_1$ thru $h_6$ are coupling variables reflecting the coupling between the center electrode and each component of the square wave drives due to the presence of the hand. It should be recalled that drive signal $\overline{SA}$ is the inverse of drive sign SA, etc. The presence of the hand causes the drives to be unequally coupled to the center electrode in the array, and hence, the ratio of imbalances is a function of hand position. If each of the phase pairs are synchronously detected separately, with each pair unbalanced to the same degree such that $SX > \overline{SX}$, there would result three square waves 120° apart (See FIG. 9).

The six steps are generated from the sum of these pairs such that:

$$S1 = +A - B + C \quad \text{1.}$$

$$S2 = -A + B - C \quad \text{2.}$$

$$S3 = +A - B - C \quad \text{3.}$$

$$S4 = -A + B + C \quad \text{4.}$$

$$S5 = +A + B - C \quad \text{5.}$$

$$S6 = -A - B + C \quad \text{6.}$$

Figure 7:
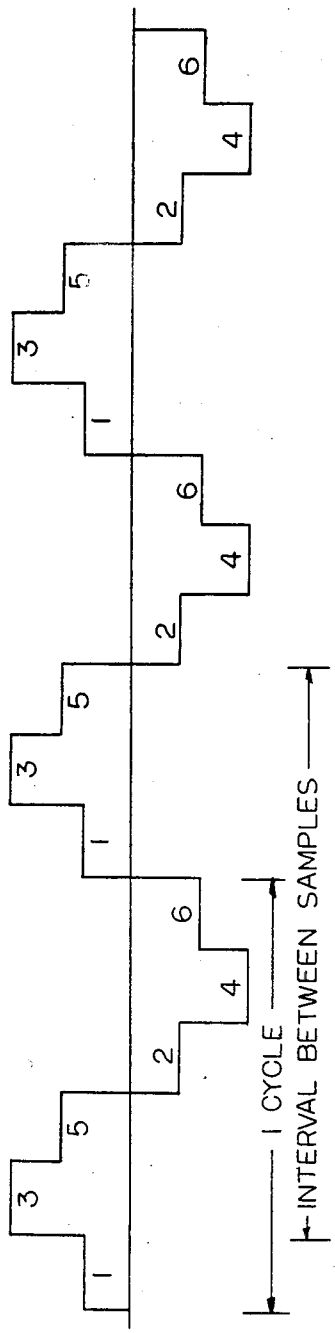
FIG. 7 is a representation of the six step signal generated by synchronously sampling the signal from the central node in accordance with the present invention.

In the above analysis S1 is step 1, S2 is step 2, etc., as reference to FIG. 7. The next step of the calculational technique is to take the six-stepped signal data and determine vectors A, B, and C. Since the six-stepped signal is symmetrical about the center line voltage, the step difference terms (SDX) can be defined to remove any small offset there may in the data. Thus:

$$SD1 = S1 - S2$$

$$SD2 = S3 - S4$$

$$SD3 = S5 - S6$$

If the above two sets of equations are then solved, the three drive waves appear as follows:

$$4A = SD1 + SD3$$

$$4B = SD3 - SD2$$

$$4C = SD1 - SD2$$

Note that in all cases, the term "4X" appears, which is four times the vectors that are being solved for. The results, 4X, have the potential of being 9-bit values as each SDX has 8-bits resolution. There is no reason to divide the result by four, as that would reduce the precision. Thus, the valves are redefined:

$$I\ A = 4A$$

$$B = 4B$$

$$C = 4C$$

The values A, B, and C have now been calculated and can be treated as vectors 120° apart. Since A, B, and C are all 9-bit values, they can no longer be kept in 8-bit registers, therefore, they are maintained in 16-bit registers (two 8-bit registers). This allows signed calculations to be accomplished using the 2's complement method, which is easier in a microprocessor. Since 16-bit registers are now being utilized, the valves can be normalized for preamplifier gain. This is done by multiplying each step difference (SD) by 4 and dividing the result by the gain G. To multiply by 4 in a microprocessor, the contents of the register are simply shifted to the left two places.

Calculation of I and J Vectors

It should be noted that the three vectors (A, B, and C) define, and actually overdefine a resultant vector. The algorithm, as implemented in the microprocessor reduces the A, B, and C vectors to a single vector at some angle with some magnitude. This is done through consolidation first into two vectors which are at right angles to each other. Traditionally, I and J are defined as unit vectors which are orthogonal (90° or $\pi/2$ radians apart). Such vectors are the x and y axes in Cartesian coordinates. Mathematically, I and J are calculated as follows:

$$I = A - (B + C)/2 \text{ and}$$

$$J = (B - C) \times ((\sqrt{3})/2)$$

The calculation of I is straightforward and needs no explanation; however, the calculation of J utilizes a simplifying approximation for use in the microprocessor. Since $(\sqrt{3})/2 = 0.866$ and $111/128 = 0.867$ therefore: $(\sqrt{3})/2$ is approximately equal to $111/128$. This considerably simplifies things, as $(B-C)$ can be multiplied by 111 and then divided by 128. Dividing by 128 in the microprocessor is done simply by shifting 7 binary digits to the right. The multiplication by 111 requires that a 24-bit wide results register be used on a temporary basis.

I and J have now been calculated on a signed basis. The next step is to separate the signs from the values, converting the values into absolute values with the signs stored as separate sign flags (SI for the sign of I and SJ for the sign of J for later use). To facilitate later calculation of the signal amplitude, two new variables are created which are I and J with reduced resolution so that the resulting values will fit into 8-bit registers, keeping in mind that I and J are, at this instant, 11-bit values. This step is easily done by shifting the values from I and J three bits to the right. All is now ready for calculation of the hand position.

Raw Count Generation

Figure 10:
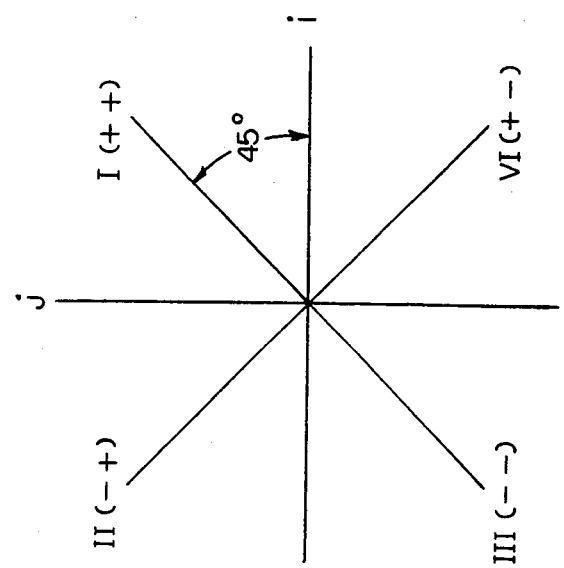
FIG. 10 is a graphic representation of a quadrant diagram showing the I and J vectors with 45° bisectors.

It is now desired to convert orthogonal vectors I and J with their sign flags into a hand position. For reasons that will become clear later, the circle is divided into 640 parts or counts (which are called Wason Counts or WC's). The angle of the resultant vector is defined by (signed) I and J using the arctangent. This calculation is broken into two parts: first, finding the angle with respect to the I axis, then finding the quadrant in which the angle lies. In FIG. 10 there is illustrated a conventional labeled quadrant diagram with 45° bisectors.

As is well known the tangent of any angle is the ratio of J to I (TAN $\theta = J/I$). Thus, to find the angle $\theta$, it is necessary to determine the angle whose tangent is J/I (arc TAN J/I). Where I is equal to or greater than J, this is no particular problem, however, where J is greater than I, then $\theta = 90° -$ Arctan (I/J). When I equals J, $\theta$ equals 45°. Thus, each quadrant can be broken into two parts. The quadrant is determined by the signs of I and J, which have been stored as SI and SJ, the sign flags. The quadrant is then determined as follows:

| SI | SJ | Quadrant |
|----|----|----------|
| +  | +  | I        |
| −  | +  | II       |
| −  | −  | III      |
| +  | −  | IV       |

First, the microprocessor program determines if I is less than J, a swap flag (SF) is set and I and J are switched. The microprocessor then finds an equivalent to the arctangent of J/I. Since the circle has been arbitrarily, but with ultimate purpose, divided into 640 parts, 45° is equal to 80 counts. Thus, the arctangent is in non-standard units. By virtue of the process, J is always less than or equal to I, hence a simple division would result in a value less than or equal to 1, a value not suited to integer arithmetic. Thus, the J value is multiplied by 256 by shifting it 8 bits to the left. This is done by concatenating (joining or linking together) an 8 bit word of zeros to the right. Thus, when J is divided by I, the resultant answer will be a value ranging from 0 to 255, a suitable range for binary logic. The tangent equivalent K is now calculated $(K=256\times J/I)$. This value can be converted into angular equivalent units utilizing a successive approximation procedure.

Successive Approximation of the Arctangent

The tangent equivalent K is converted into angular equivalent units (WC's) through the use of a successive approximation algorithm which utilizes an 80 point sequential table. The table is generated by the following simple BASIC program:

```
100 PI = 3.141592654: REM === CREATE LOOK UP TABLE ===
110 D = 2 × PI / 640
120 DIM VA(79): REM === DIMENSION ARRAY ===
130 PRINT TAB (6); "W";TAB(15);"INTEGER"
140 FOR W = 0 to 79
150 T=D/2+(W×D): REM ===HALF-WAY BETWEEN W'S ===
160 LU=256×TAN(T)
170 VA(W)=INT(LU+.5): REM ===ROUNDOFF TO INTEGER ===
180 M1 = 7 - LEN(STR$(W))
190 M2= 20 - LEN(STR$(VA(W)))
200 PRINT TAB(M1);W;TAB(M2); VA(W)
210 NEXT W
220 END: REM === END OF LOOK UP TABLE CREATION ===
W = angle in WC's (remember, 2π = 640 WC's)
T = an angle half way to the next W
VA(W) = integer value of K
```

This results in a table of values set forth in FIG. 11c of the drawings.

Successive approximation is a process of converging on a value or solution by making a series of guesses within a set of rules. Two limits are defined, an upper and lower limit; the designated value is then compared to the value stored in the register midway between the upper and lower limits. If K is greater, then the midpoint becomes the new lower limit. Conversely, if K is less than the midpoint, then the midpoint pointer becomes the new upper limit. The process is repeated until a single value is converged upon. The following variables are defined:

K=Our calculated arctangent equivalent
WP=Current center pointer and final output word,
UP=Upper pointer,
LP=Lower pointer,
VA(XP)=Value in register at the pointer location X.
Keeping in mind that the goal is to determine the WP, the following procedure is used in a successive approximation subroutine (SAS):
1. If K>1, then WP<0, then exit SAS
2. If K>253 the WP=80, then exit SAS
3. Set UP=79
4. Set LP=0
5. Set $WP=(UP+LP)/2$ (take integer value)
6. Get VA(WP)
7. Is K>VA(WP)?
  A. If yes, LP=WP (Redefine lower pointer)
  B. If no, UP=WP (Redefine upper pointer)
8. Is (UP−LP)×1?
  A. If yes, then return to #5 above
  B. If no, then WP=UP, then exit SAS.

Note that there are three places that the subroutine can be exited: after step 1, after step 2, or after step 8B. In any of these three cases, WP is defined. The maximum number of times that it is necessary to go through the loop defined by steps 5 through 8A is seven. This is a very efficient method of searching through the table of arctangent values to find the one which most closely approximates K. The "address" (WP) of the value is the angular equivalent needed to proceed with the calculation of the hand position.

Sector and Quadrant Selection

Earlier in the processor program, there was stored a value (SF) to indicate whether or not the I/J vectors had been swapped. That value is now used to determine which sector of the quadrant (FIG. 10) WP is in. In all cases, if the I and J values were not swapped, WP lies in the sector closest to the "I" axis. Conversely, if a swap of I and J was made, the resultant vector or WP lies in the sector closest to the "J" axis. The rules are simple. If the swap flag (SF) is clear, the WP=WP. Conversely, if the SF is set, the WP=160−WP.

Now the vector can be placed in the proper quadrant and the value of W calculated with a decision tree based on the signs of I(SI) and J(SJ):

If sign of SI is + (or zero) and:
  If sign of SJ is + (Quadrant I), then W=WP, exit
  If sign of SJ is − (Quad. IV), the W=640−WP), exit
If sign of SI is − and :
  If sign of SJ is + (Quad. II), then W=(320−WP), exit
  If sign of SJ is − (Quad. III), then W=(320+WP), exit There has now been determined a value W which is in the range of 0 to 639. Before being converted into a final dial digit reading, some compensations must be applied.

Compensations

On the value W which has been determined as being representative of the hand position, there are now three types of compensations to be performed. Those are offset, amplitude, and inter-dial compensations. Various factors cause W not to be 0 when the hand is apparently in a 0 position. That is, the relationship between W and the true hand position may have some deviation. One type of deviation may be that, because of manufacturing considerations the physical layout of the electrode array is such that when the hand is in the 0 position, the calculated value W is offset by some fixed amount, which also applies to all values around the dial. This is referred to as an "offset" compensation and is adjusted through a baseline adjustment. Another type of deviation which may occur is a function of the distance between the hand and the array, called the "z" spacing to correspond to the traditional Z axis in a polar coordinate system. To compensate for the "z" effect an adjustment value, based on the signal amplitude, is applied to the detected signal W. Finally, each dial reading must be adjusted so that information from the previous dial readings are used to reduce or remove effects of small errors in hand alignment (physical alignment) or electronic process (noise and non-linearity). This is referred to as "inter-dial" compensation and will be discussed hereinafter.

Offset compensation is a baseline correction for the gross rotation of the array pattern. The calculated hand positions have an average offset from the true hand position. This offset is adjusted by adding a constant value (OS) to the detected signal count W. Therefore, $W=W+OS$. The offset compensation value is generated when the amplitude compensation table is generated, as OS defines a starting point to be used on the amplitude compensation curve.

Amplitude Compensation

The offset changes as the spacing between the hand and the array changes. Fortunately, the amplitude of the six-step signal is a function of the spacing between the meter hand and the driven array. It has been found that the relationship between the offset and the amplitude (RA) may be approximated with the following equation:

$$\text{Total Offset} = a + b(RA) + c(1/RA)$$

a, b, and c are constants which are generated from experimental data. This experimental data involves generating amplitudes (RA) and uncompensated W's at a number of known hand positions at a number of known spacings (z's). From these values the constants a, b, and c are generated by multiple regression techniques.

The total offset could be calculated directly; however, it would require a considerable amount of memory space and time in the microprocessor based system, so a lookup table is used. The amplitude is calculated from vectors I and J as follows:

$$RA = \sqrt{(I^2+J^2)}.$$

Both I and J are 11-bit values, hence squaring and summing them results in a 22-bit value. This is too cumbersome to work with, so rather than using the entire amplitude RA, a truncated version of the amplitude is used. Recall that a truncated version of vectors I and J (referred to as IV and JV) were generated earlier in the process. These are both 8-bit values, and now there is defined a new value RS which is the sum of the squares of these values, has a maximum bit size of 16, and is always positive.

The range over which the amplitude compensation is to be performed is selected and the offsets are calculated at points midway between the adjacent values on a lookup table. Instead of the equation using RA, there is generated an equivalent equation using the square root of RS. Thus, $$\text{Total Offset} = a + b(\sqrt{RS}) + c(1/(\sqrt{RS})).$$

This equation is solved for RS as a function of total offset (TF), a, b, and c with the following result:

$$RS = [(((TF-a) + ((a-TF)-4bc)))/(2b)]^2$$

From the results, there is generated a list of values of RS as a function of TF at intervals which are used in the lookup table. The minimum RS value permitted was selected as the bottom of the lookup table and this point is defined as P(min). The lookup table address of the stored values of RS are equal to the corresponding TF−(½ the interval between TF's). The minimum TF was set as the base offset (OS), above. The lookup table is used to generate the amplitude compensation value (AC).

The program uses the lookup table as follows:
1. Calculate RS
2. Set pointer at P(min)
3. Compare the Actual RS with the value in TF(P)
   If Actual RS is less than value in TF(P), signal is too small, go into fault mode
4. Set pointer at TF(P)
5. Compare the Actual RS with the value in TF(P)
   If RS is less than lookup table value at TF(P) then AC=TF(P) Add AC to WC ($WC=WC+AC$); Exit subroutine
   If RS is greater than value stored in TF(P) go ahead to 6
6. See if P is equal to P(max)
   If P is equal to P(max), then AC=TF(P) Add AC to WC ($WC=WC+AC$); Exit subroutine
   If P is less than P(max), then Increment pointer P Go back to #4, above Having compensated for all of the above, the count is now as accurate as possible for a single dial.

Inter-Dial Compensation

If the position of a single dial pointer were infinitely accurate, and it could be reliably resolved with the measuring system, there would be no need to have more than one dial on a meter register. The only necessary hand would be the most significant digit, which would be read with the necessary resolution. This is obviously not possible. There is back lash in the gear train, and the encoding technique obviously has limits to its accuracy. It is therefore necessary to actually read all of the hands on a register. Given that there may be inaccuracy in determining the true position of the hand, we must cause each hand to be consistent with the previous (less significant) hand readings. Reference is now made to U.S. Pat. No. 4,214,152 where this problem is discussed and solved according to an earlier technique.

Consider two adjacent dials $D_1$ and $D_2$ for which $D_1$ is the least significant of the two dials and $D_2$ is the most significant of the two dials. Each of the dials include decimal digits arranged in a circular pattern from 0 to 9. The distance between adjacent digits is then 36 degrees. Assuming each dial could be resolved to 100 parts with an accuracy of ±3 parts, we can read the digits to 0.1±0.3. Now, presume the two dials have just been read with the following values:

$D_1 = 9.2$, $D_2 = 4.1$.

Is the reading 49 or 39? How does an encoder determine what the right reading is? The correct value for $D_2$ can be resolved by examining the least significant dial $D_1$. Dial $D_2$ is very close to the transition from "3" to "4". Thus, it can be seen that it should be read as a "3", for dial $D_1$ is close to, but has not yet passed the transition from 9 to 0, which would cause the next dial to logically transition to the higher digit.

To solve this problem an adjustment factor derived from the reading of the previous dial is added to remove this potential ambiguity. It is important to note that the adjusted reading of the previous dial is used in determining this adjustment factor: thus an adjustment factor determined in reading a previous (less significant) adjacent dial is applied to the reading of a subsequent (more significant) dial. More formally the generation of an interdial correction factor for the more significant adjacent dial is always performed after the generation of the correction factor from the previous dial. The determination of all such correction factors proceeds as follows. The transition of the more significant digit of a digit pair should occur upon the transition of the less significant dial from 9 to 0. The value of the less significant digit contains the correct information to resolve possible ambiguities of the more significant digit. In the following discussion these terms will be used:

Terms relating to desired output format (or number base system):
- D = number of digits into which a dial is divided, normally equal to N,
- $D_A$ = adjusted digit value,
- D' = digit value, less significant dial,
- D" = digit value read before interdial correction, one level of significance higher than D',
- N = total number of digits per dial, and gear ratio between adjacent dials,
- R = reference zero,
- A = digit adjustment value,
- A" = adjustment value determined from less significant dial reading, D', to be applied to D",
- $A_d$ = adjustment value in digitized levels, Terms relating to internal reading and correction process prior to output:
- d = number of digitized levels into which a dial is resolved,
- d', d" = digitized level value for a particular hand or shaft position,
- $d_A'$, $d_A"$ = adjusted digitized level value,
- n = dial number being read.

It is desirable and useful to add (algebraically) an adjustment to the more significant digit to increase the probability of having a correct digit reading and to cause a sharp transition as the less significant digit undergoes a transition to zero. This adjusted value of the more significant digit can be expressed:

$$D_A" = D" + A" \quad \text{(Eq. 1)}$$

Presume that each digit dial can be resolved into d, digitized levels, and that for initial considerations, d is a large number approaching, for practical purposes, infinity; note that resolution is merely the number of digitized levels, and is not the accuracy of the determination of hand position, although it represents the upper limit of accuracy for a single reading. Digit value, D', is related to the digit levels, d', by the ratio:

$$D' = d'\left[\frac{N}{d}\right], \text{ e.g. } 6 = 384\left[\frac{10}{640}\right] \quad \text{(Eq. 2)}$$

It is readily apparent that the maximum mechanical error of the more significant hand is plus or minus one-half digit. Thus, as the least significant digit approaches the transition from (in resolved digitized levels) d' = d to d' = 0, or in decades, from 9.9999 to 0.0000) if, at d' = d, the equivalent of one-half digit were subtracted from the more significant digit, and if, as the less significant digit passes the transition, one-half digit were added to the more significant digit, readout would undergo an abrupt transition from one digit to the next higher digit. Obviously, if the maximum error of hand reading is plus or minus one-half digit, then when the least significant digit is at the point farthest from next significant digit transition (i.e., 5 on a decade system), then adding or subtracting one-half digit to or from the next significant digit is apt to cause an error. When D' = ½N (shaft rotation is 180° from the next significant digit transition), the adjustment, A", should be zero. The optimal adjustment for a decimal system can be written:

$$A"_D = \frac{1}{2} - (D'_A/N) \quad \text{(Eq. 3)}$$

This equation has the desired property of having an absolute maximum when D' is 0 or D, and a minimum when D' = ½N. Note that $A"_D$ is derived from D', the less significant digit and applied to D", the more significant digit. The actual adjustment must be made in terms of resolved or digitized levels and must differentiate between slightly before and slightly after a digit. Equation (3) thus becomes (using equation (1)):

$$A"_d = \frac{1}{N}\left[\frac{d-1}{2} - d'\right] \quad \text{(Eq. 4)}$$

the quantity comprising the correction factor to be added from the previous less significant dial and to be independently determined for the next more significant dial. [Note (1) that $(d-1/N)\frac{1}{2}$ is used rather than $(d/N)\frac{1}{2}$ because d is not a continuous variable; (2) that strictly speaking Eq. 4 is equivalent to $$\left(\frac{nd}{2} - 1\right)\frac{1}{N}$$

which approaches (d/2) in the limit as n→∞].

From the foregoing analysis a compensation technique has been developed based on an equation derived for the maximum possible compensation achievable of the $n^{th}$ dial which will provide a binary compensation value utilizing the information from all previous dials. The desired digit reading of the $n^{th}$ dial, $D_n$, shall be called $R_n$, such that:

$$R_n = INT\left(\frac{10}{C}\left(C_n + \frac{C-1}{20} - \frac{C}{10}\sum_{i=0}^{n-1} R_i \frac{1}{10^{(n-i)}}\right)\right)$$

The terms are defined as:
- n = Dial number (1 = Least significant dial),
- C = Maximum permissible counts or states (again, this system using 2560),
- $WC_n$ = Number of counts for Dial n (0–2559),
- $R_i$ = Reading (decimal) for $i^{th}$ dial (integer from 0 to 9)
- $R_n$ = Reading (decimal) for $n^{th}$ dial (integer from 0 to 9)
- $R_{n-1}$ = Reading (decimal integer) for $(n-1)^{th}$ dial,
- INT = Integer value of term which follows, truncate to decimal point.

The equation (above) has three terms:

$WC_n$, the raw counts, $\frac{C-1}{20}$, a constant term and,

-continued $$-\frac{C}{10}\sum_{i=0}^{n-1}R_i\frac{1}{10^{(n-i)}} = Y.$$

Each of the terms is multiplied by 10/C. The second, constant term is always the same, so no special program manipulations are required. Note that the "Y" term is generated from the previous less significant dial digits ($R_i$), thus the Y term generated before this dial ($R_n$) is already compensated.

Figures 21, 22A:
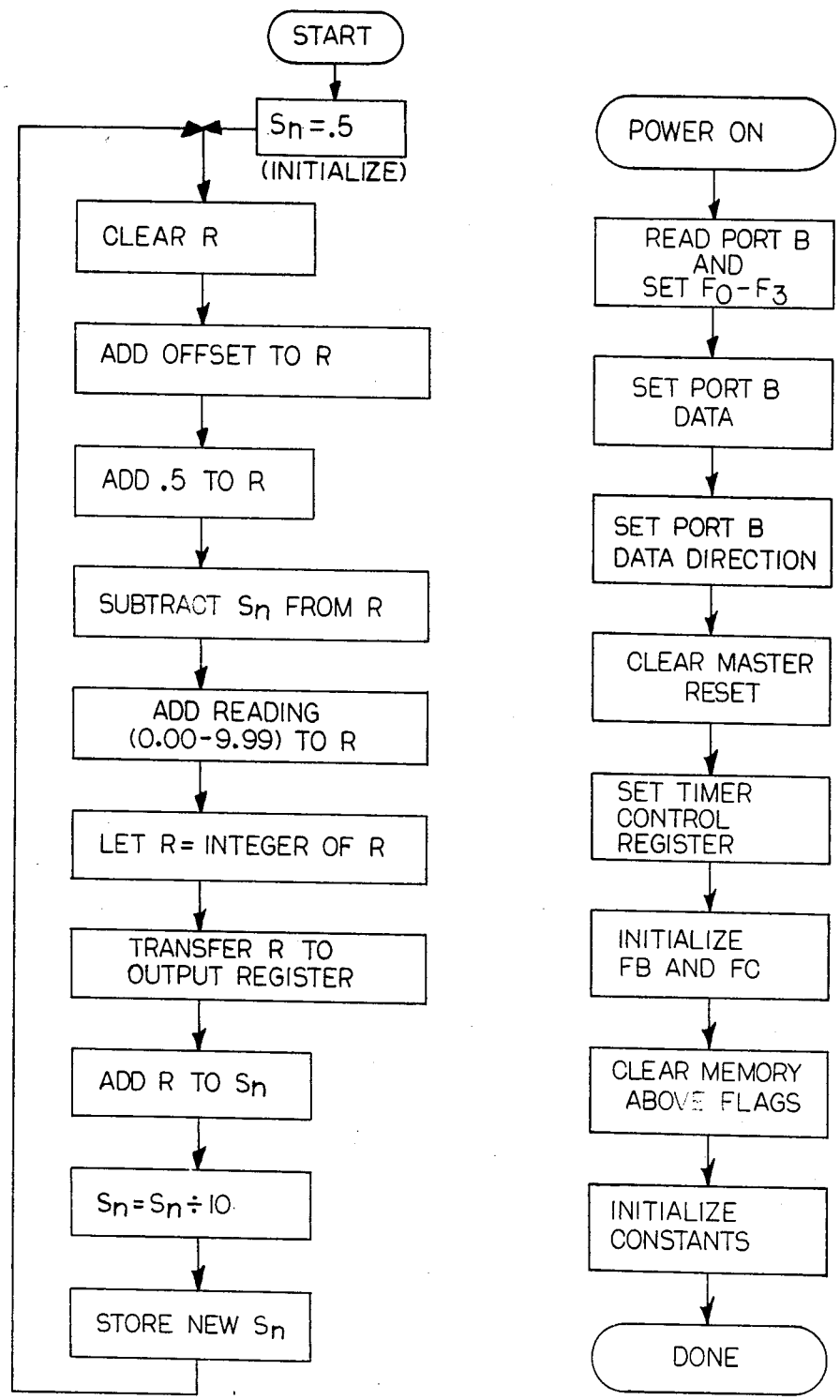
FIG. 21 is a program flow chart of the interdial compensation technique.
FIGS. 22a thru 22q are program flow charts of the system of the present invention.
Figure 22B:
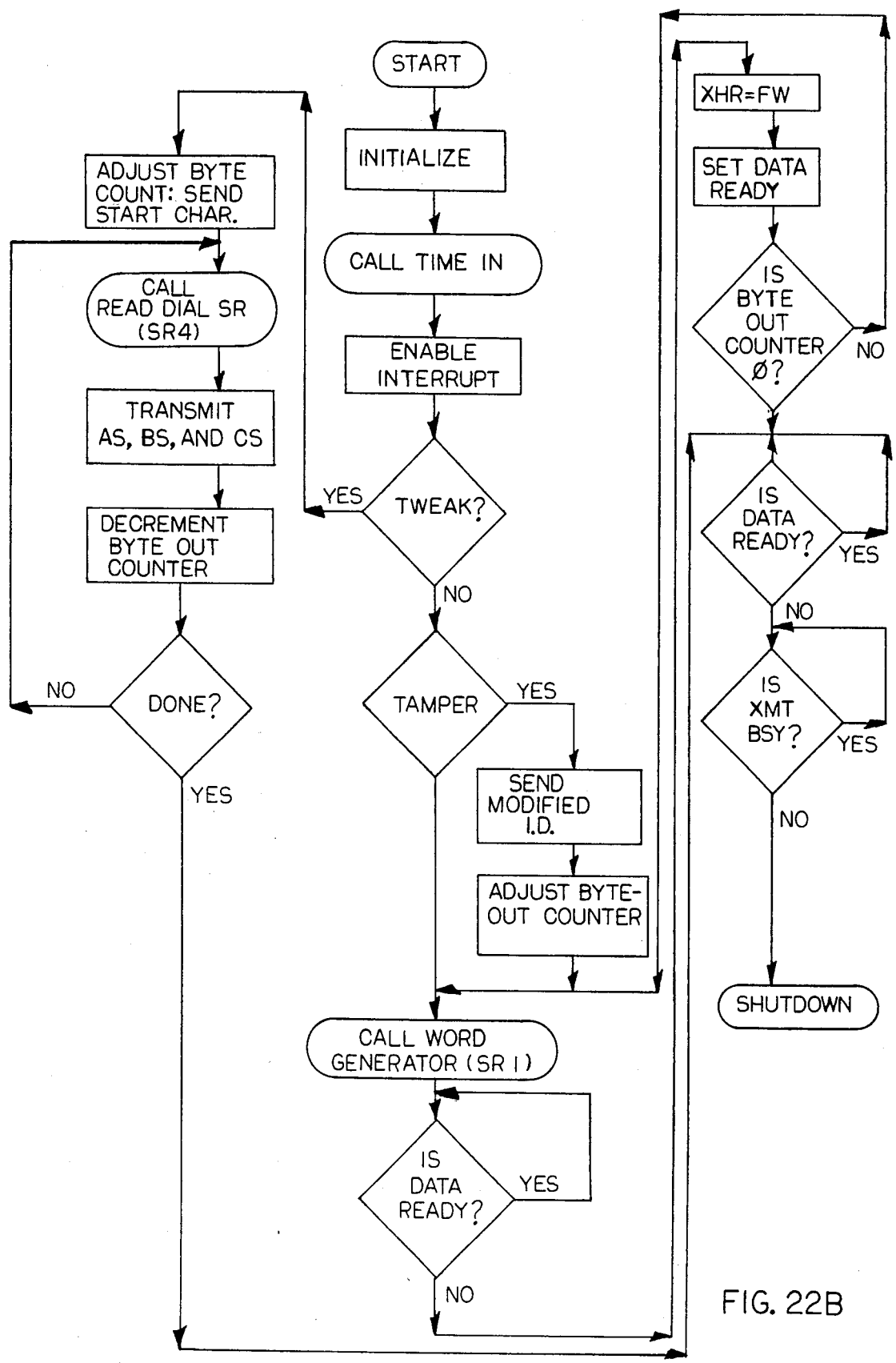
Figure 22C:
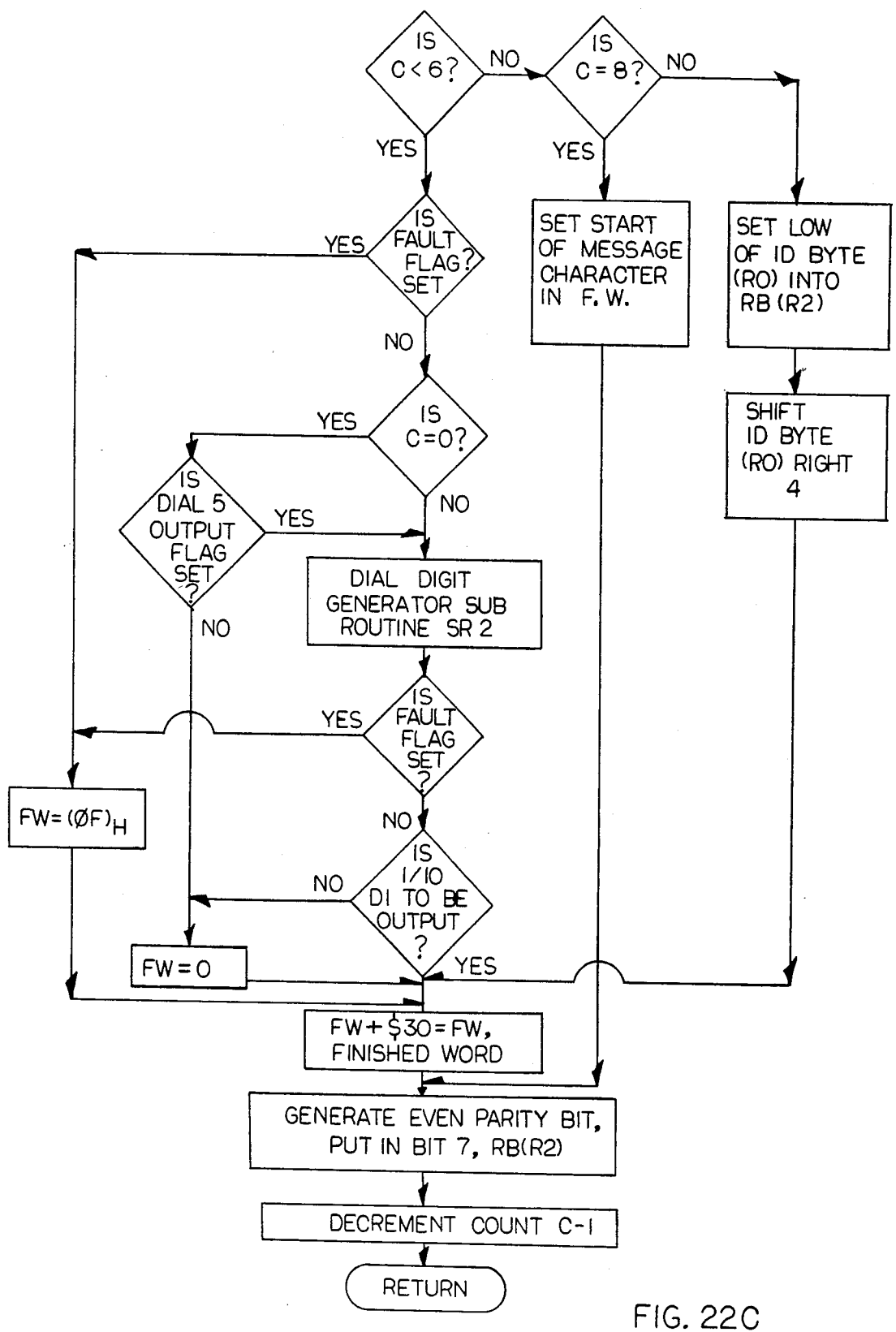
Figure 22D:
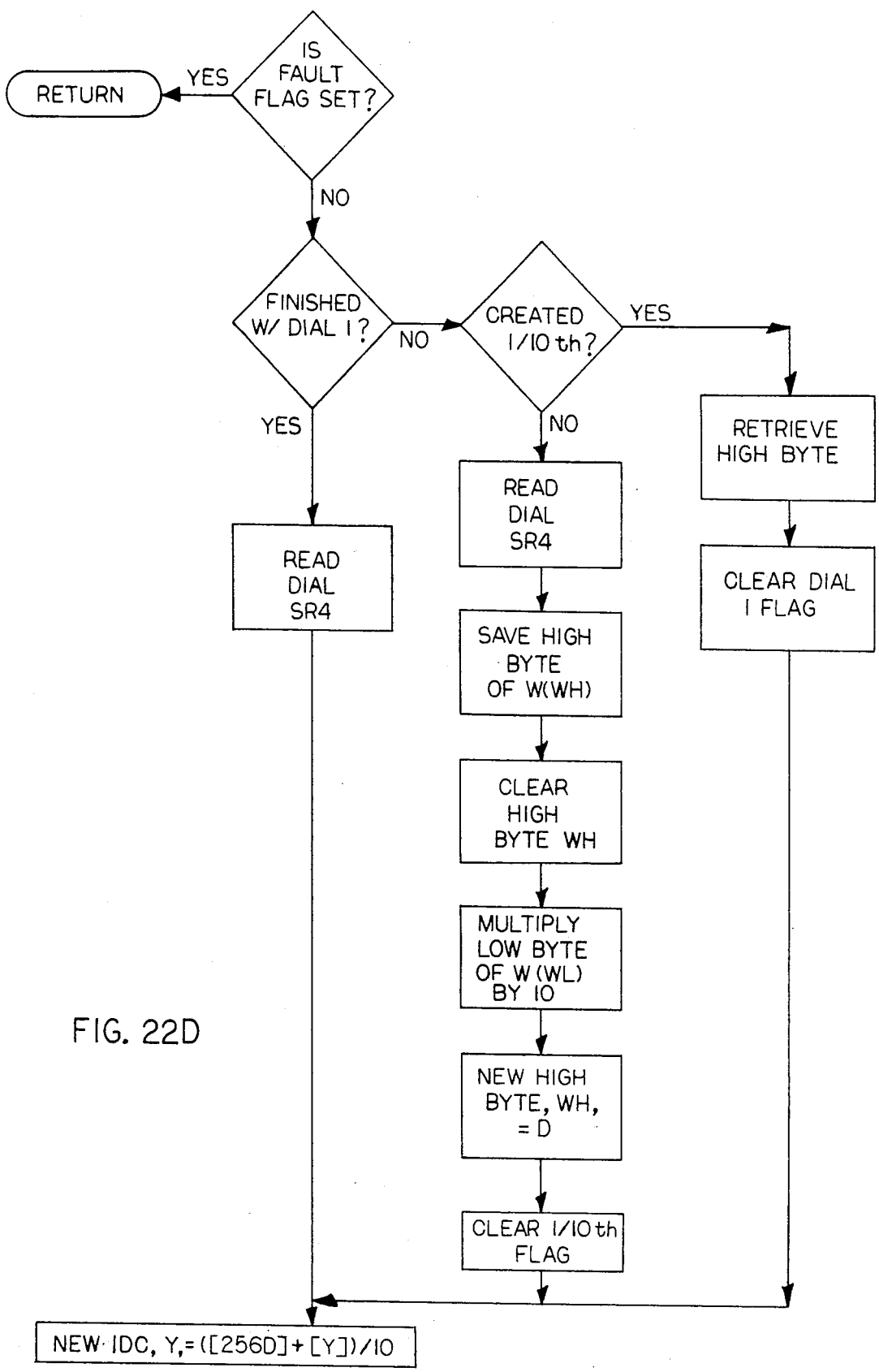
Figure 22E:
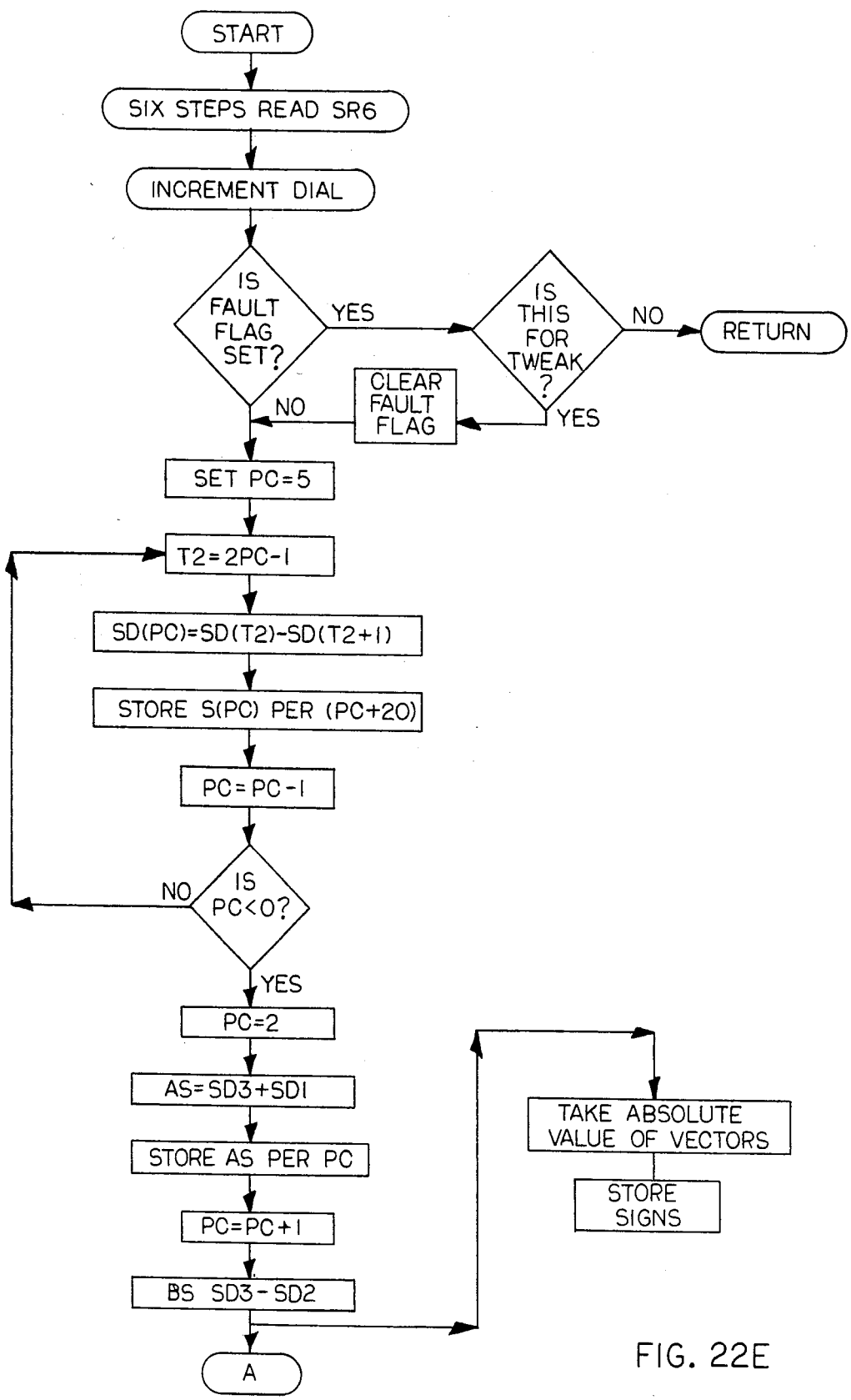
Figure 22F:
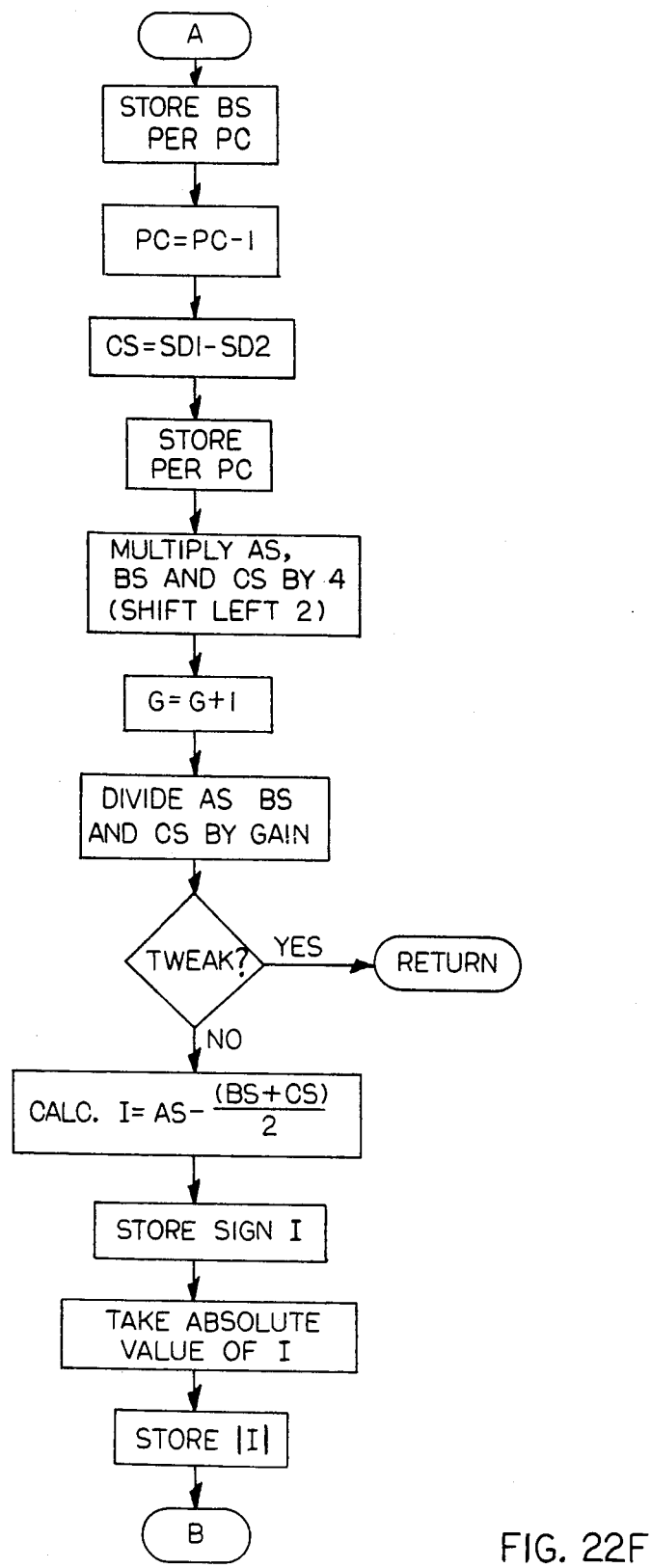
Figure 22G:
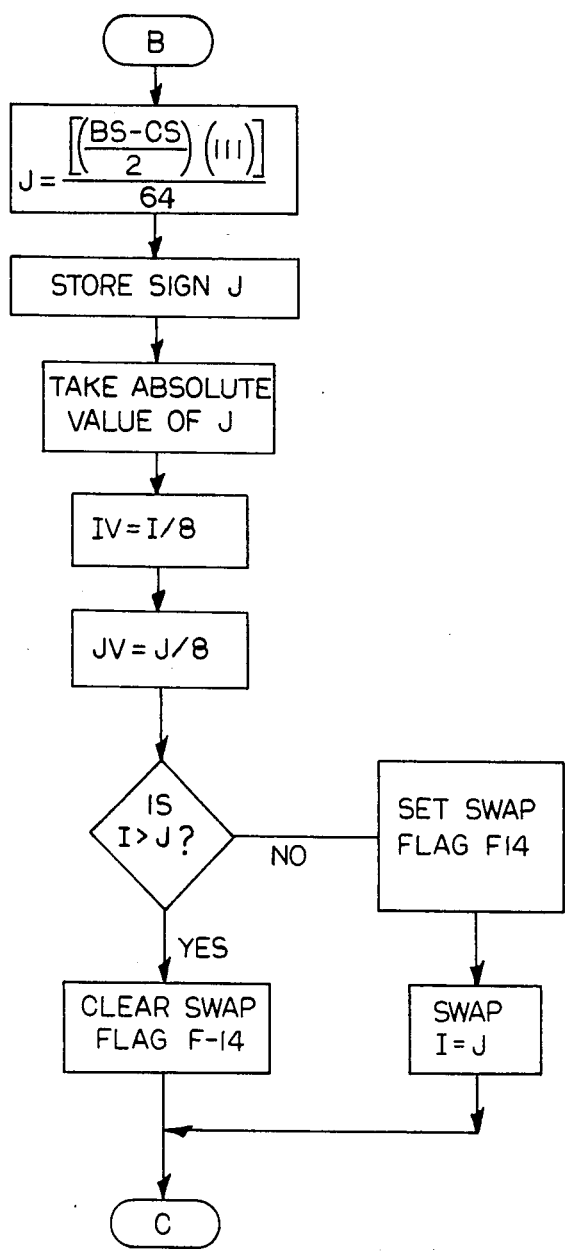
Figure 22H:
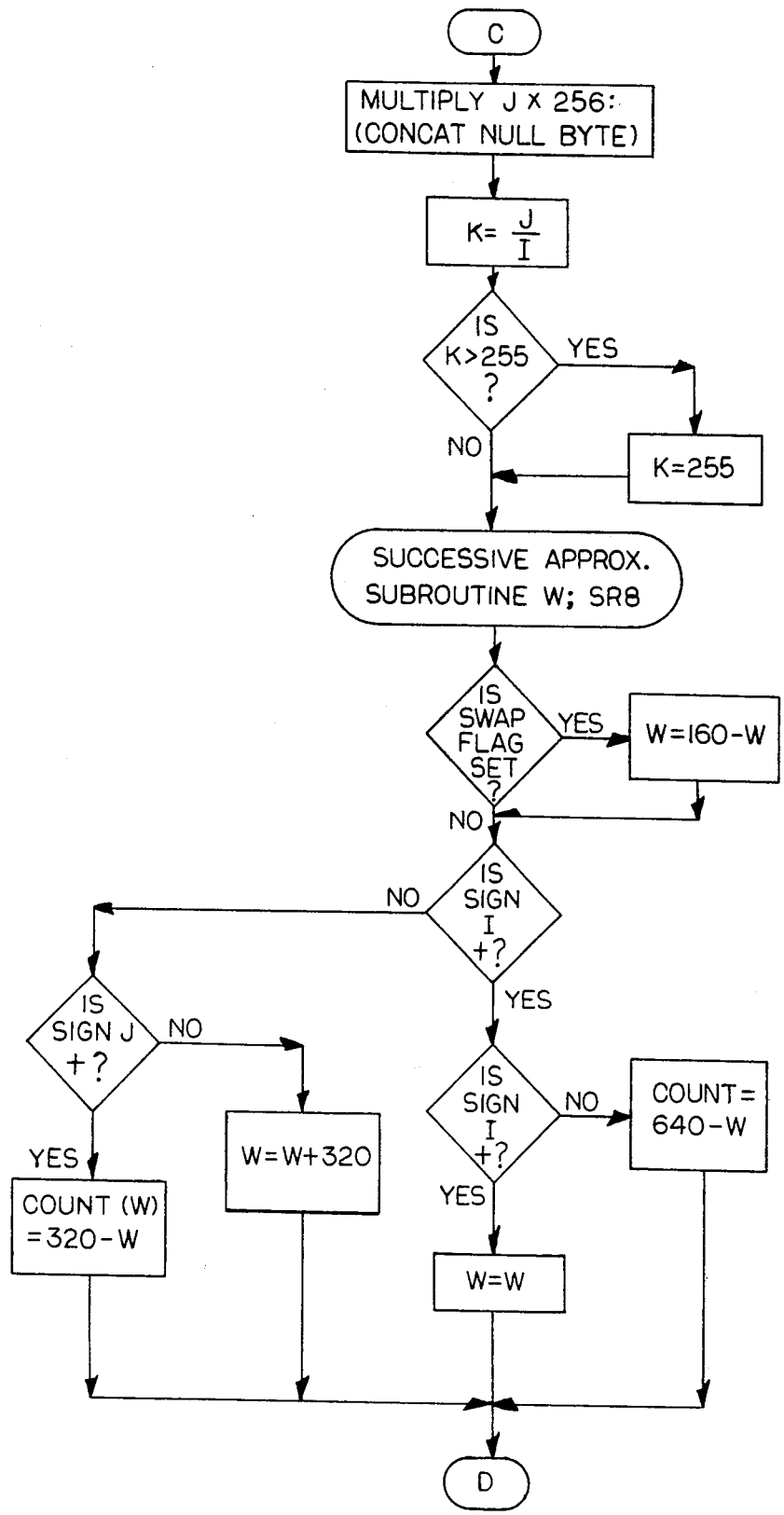
Figure 22J:
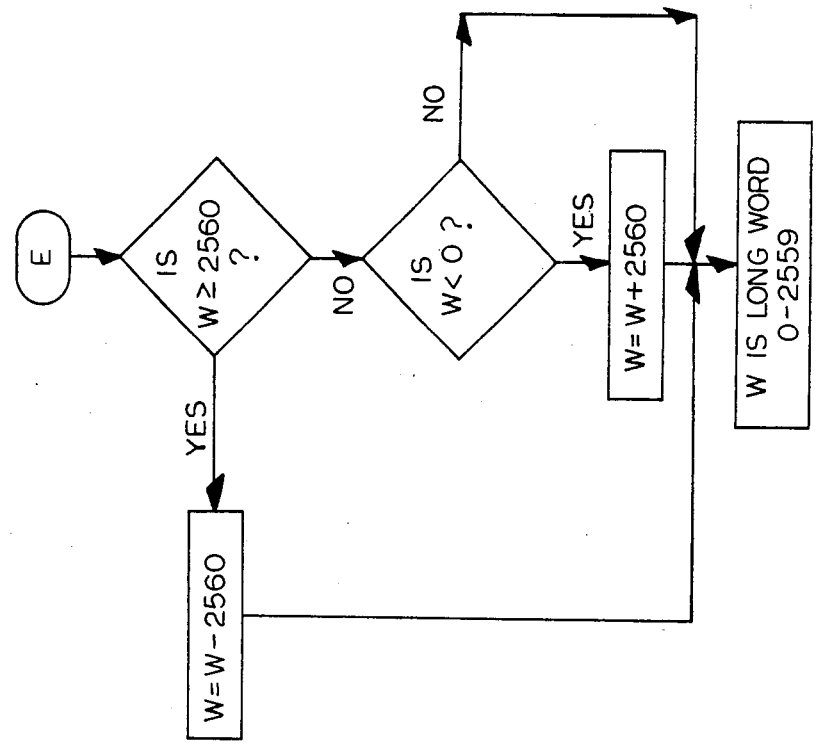
Figure 22I:
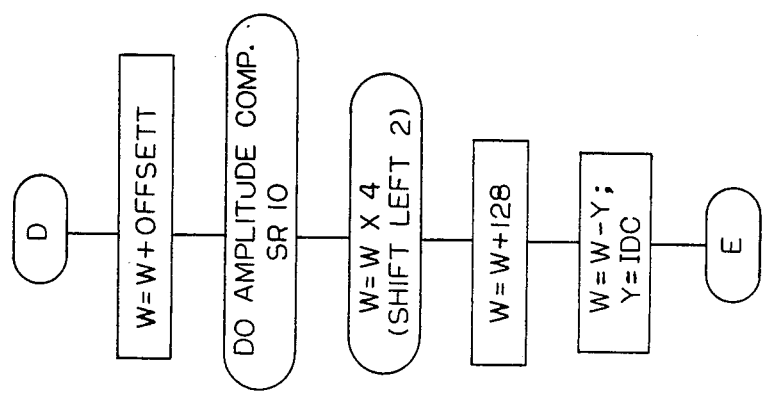
Figure 22K:
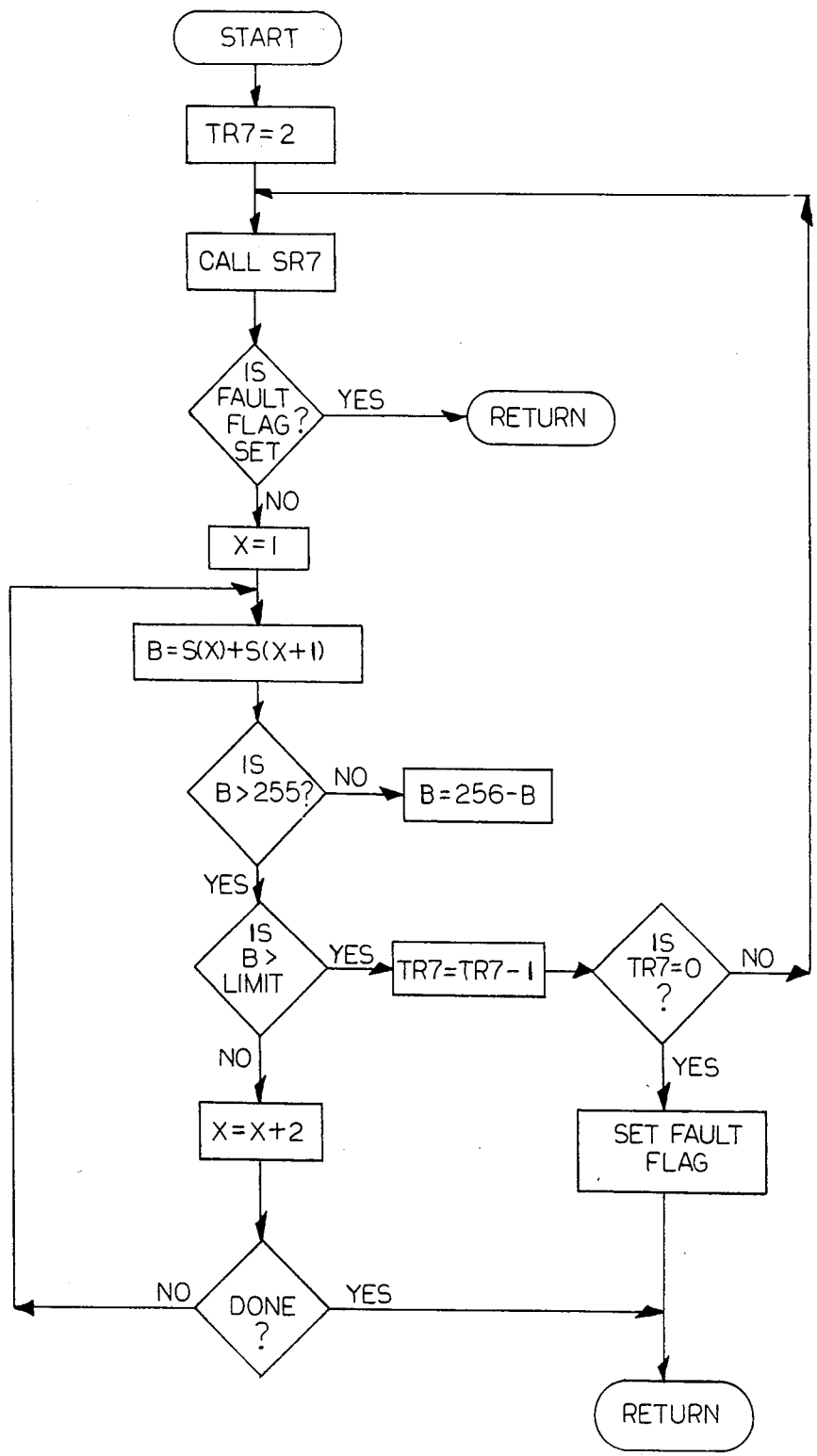
Figure 22L:
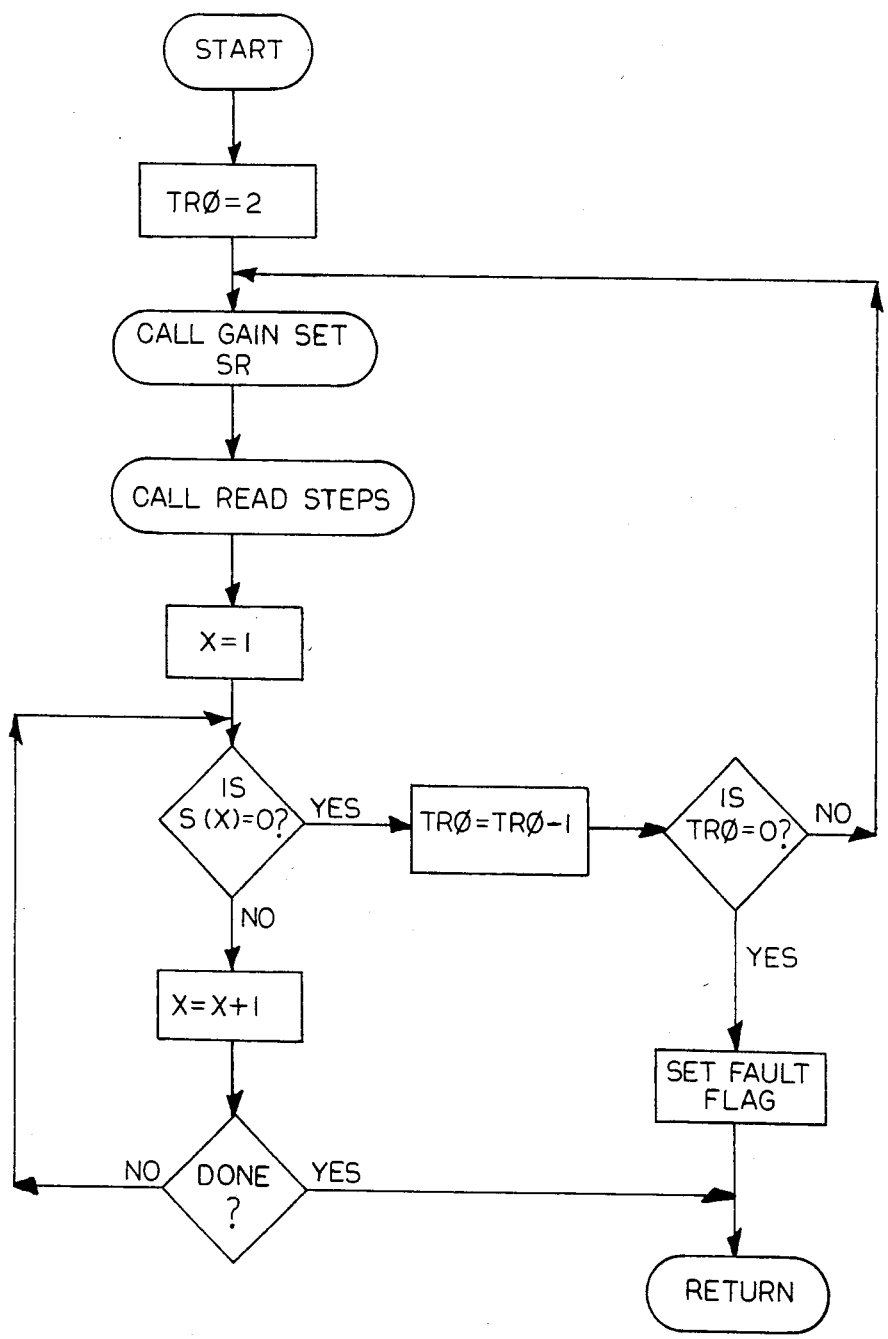
Figure 22M:
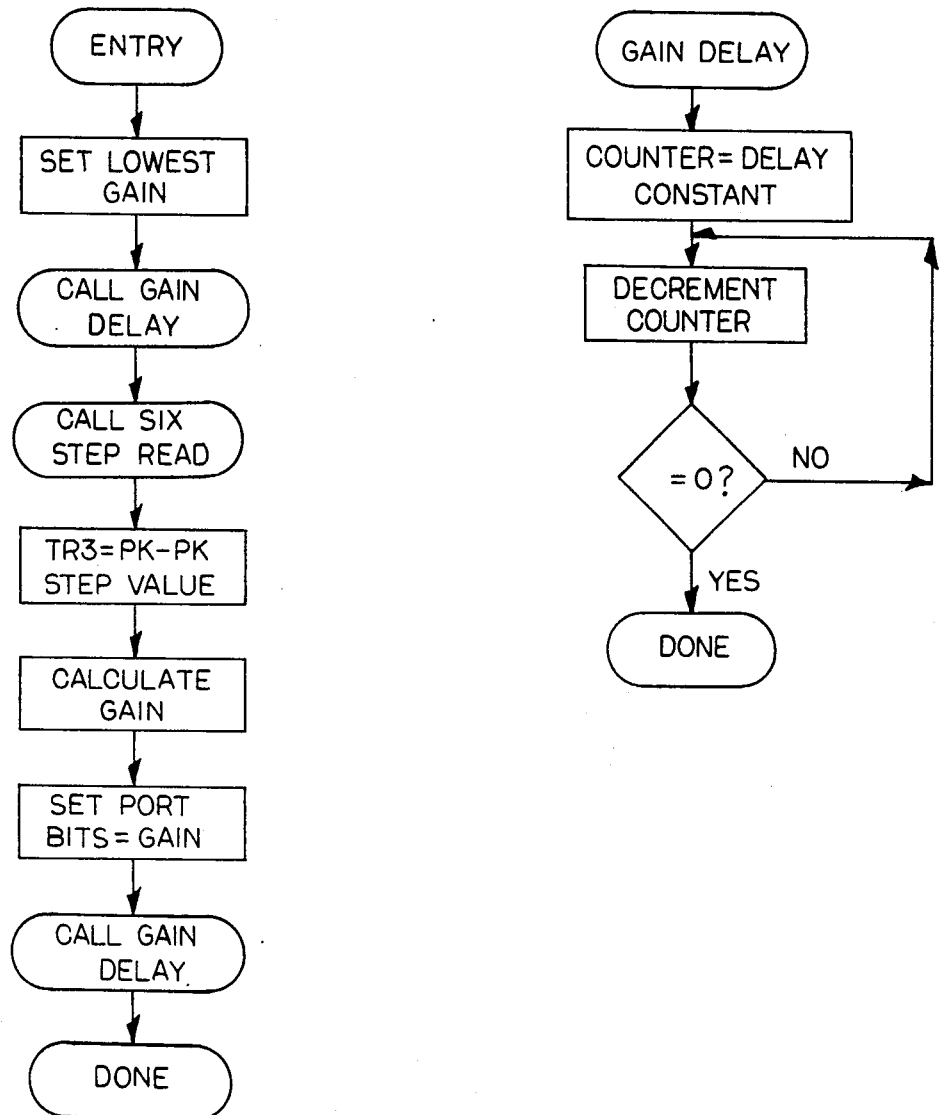
Figure 22N:
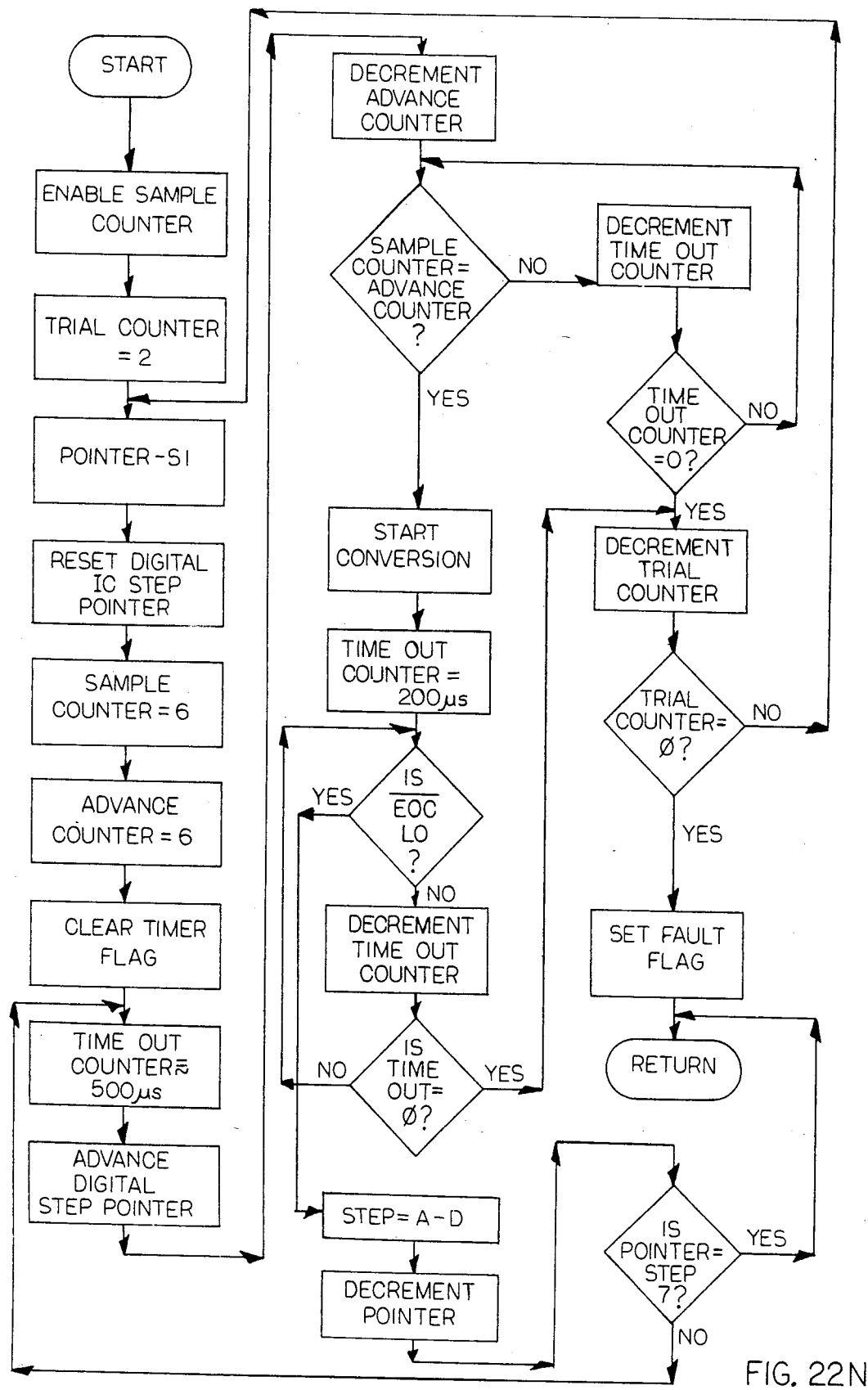
Figure 22:
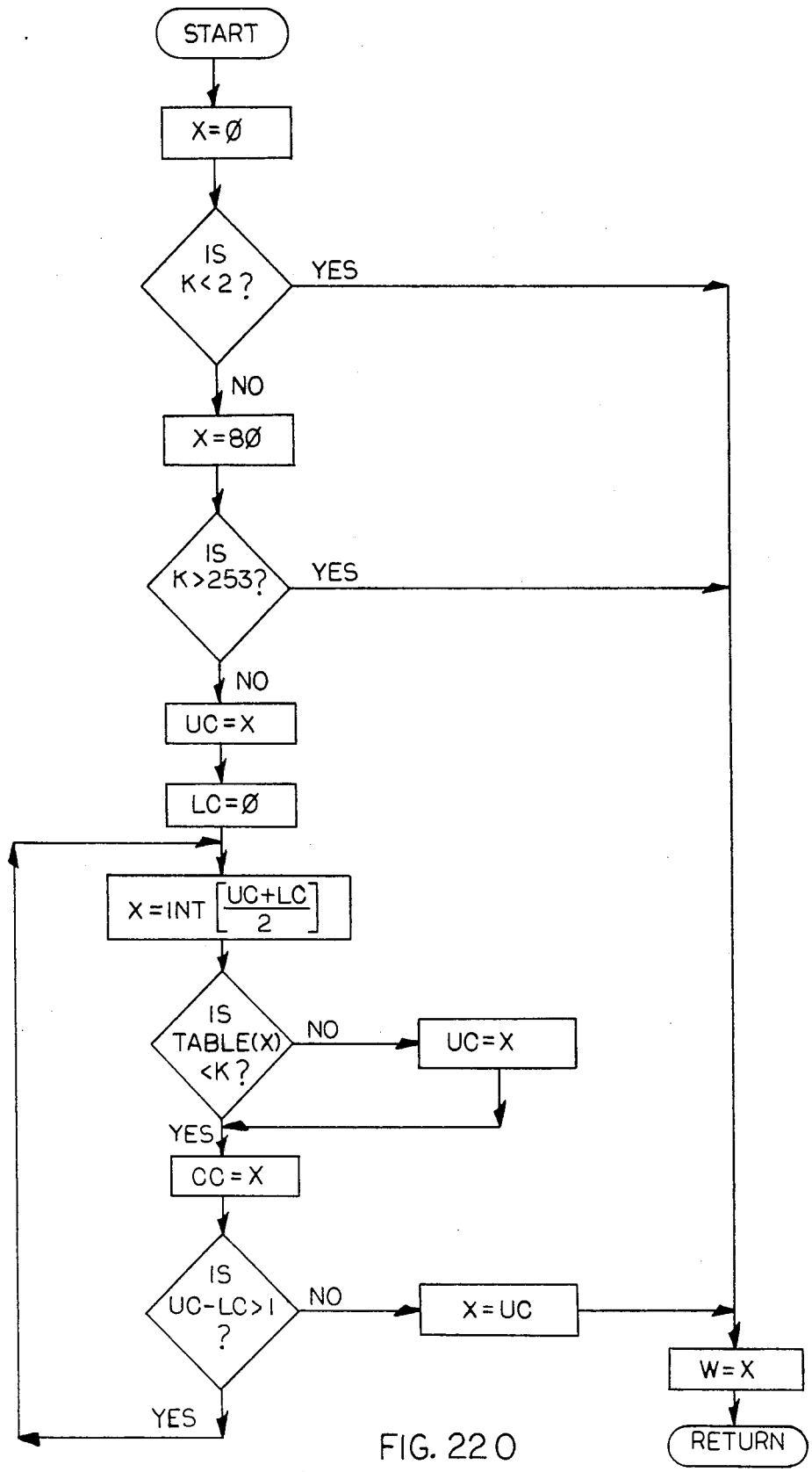
Figure 22P:
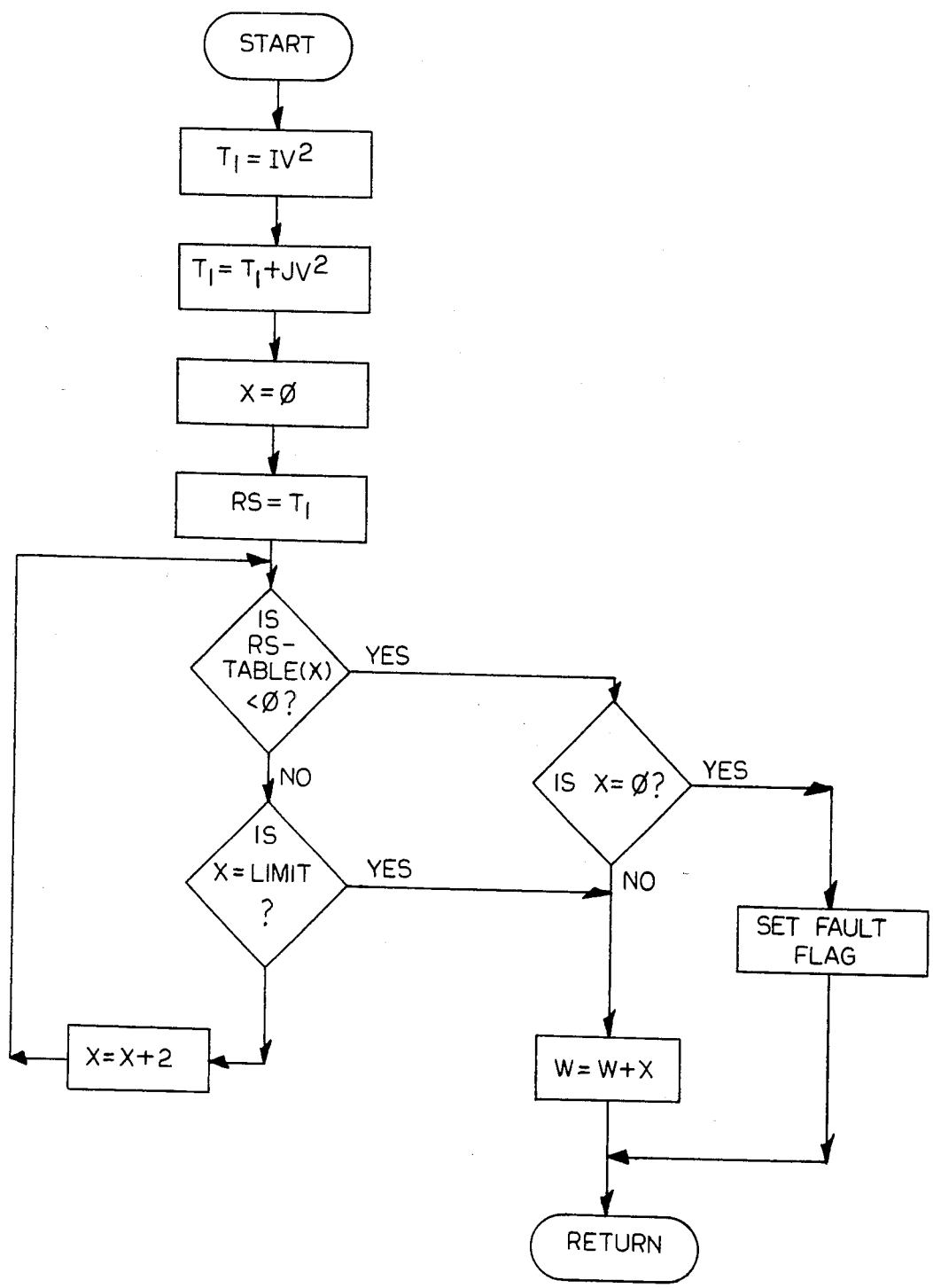
Figure 22Q:
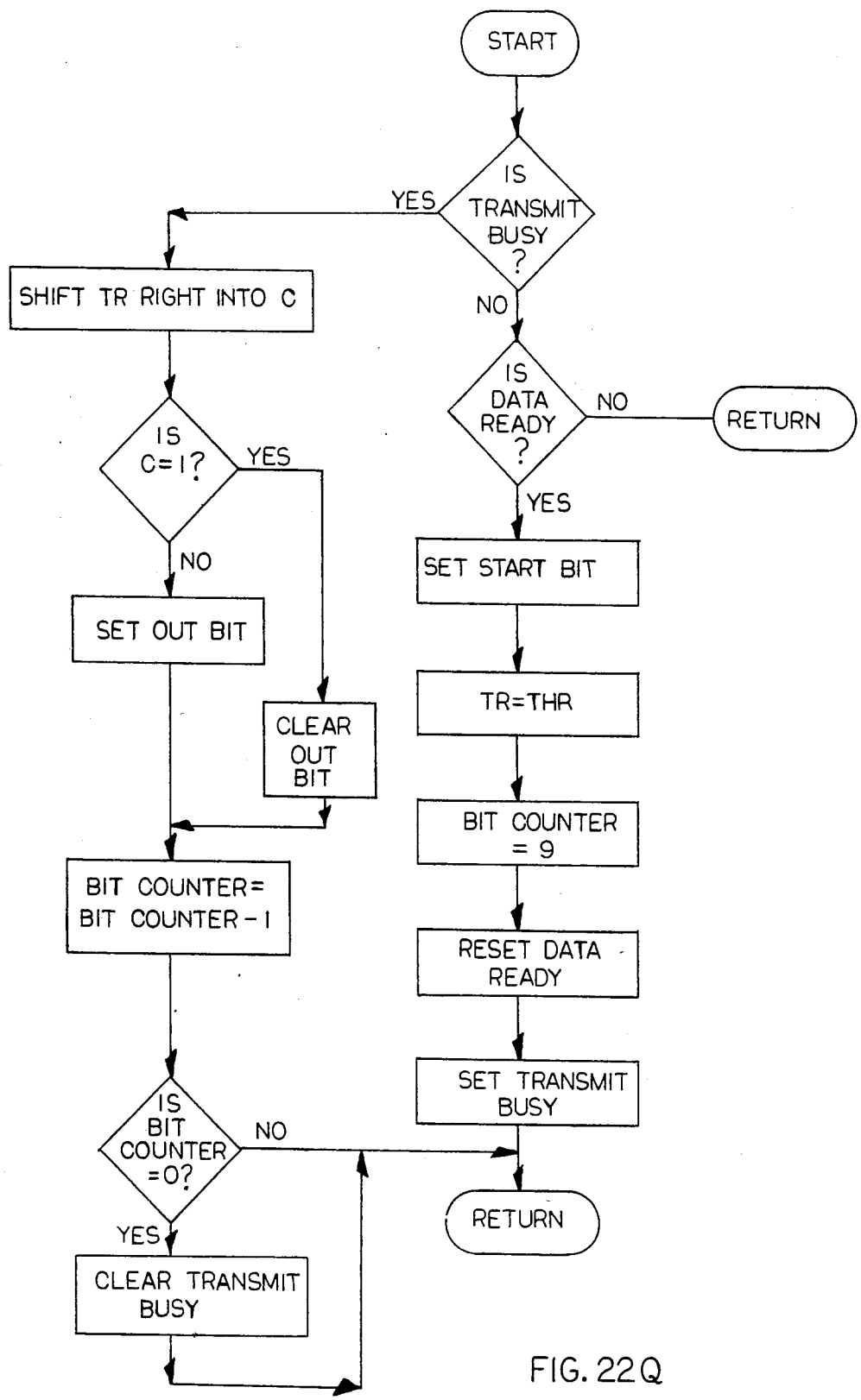

The addition of the three factors above is accomplished in a simple sequence. For a decimal based system, the flow chart of FIG. 21 outlines the procedure. For the binary system described herein, the following procedure is used:

1. $WC_n$ is shifted left two places; this is the same as multiplying it by 4,
2. To the result is added 128, which is 640/20×4,
3. From this a value $Y_1$ is subtracted; the result is W,
4. Wrap around is checked:
   if W is greater than or equal to 2560, then 2560 is subtracted from it,
   if W is less than 0 then 2560 is added to it.

At this point there has been created a variable W for each dial, which variable has a value from 0 to 2559, Steps 2 and 3 above performed the inter-dial compensation (IDC), but in a number based from 0 to 2559 (2560 possible values). It can be seen that WC is selected from the family of values defined by the equation: $WC=2560/(2^m)$ for integer values of m from 0 to 8. Selection of m is based on the needs of the particular situation. For this application m=2. This number is 12 bits long. Now it must be converted to a decimal value and truncated, after which a new IDC value $Y_1$ can be generated.

Conversion to BCD

It is now desired to send out the final digit value for the dial in ASCII code. For the numerical values (0–9) this means that the first 4 bits form the binary coded decimal (BCD) of the number. This is simply the binary equivalent of the number in 4 bits (e.g. 0=000; 1=001; 2=0010; 3=0011; 4=0100; etc.). This is then combined with three control bits and a parity bit (P011). P is the parity bit which allows checking on the receiving end for data transmission errors.

It will be recalled that there has been generated a 12-bit value W for the dial reading. This 12-bit value will be truncated to the digit value $R_n$. By virtue of the manipulations which have been performed, the highest 4 bits of the 12-bit value are the BCD value of $R_n$. Since the manipulations have been accomplished in an 8-bit microprocessor, it is an easy matter to drop out the low byte W1 (which is the lowest 8 bits), so that this information is not transmitted.

Returning now to the generation of $Y_1$ the IDC value the value just generated for the dial digit is used to generate a new $Y_1$ for the next dial. The following mathematical operation is performed:

$$Y_1=((R_n\times 256)+Y_1)/10$$

Now this is done as follows:
1. multiply the existing dial reading, $R_n$, by 256,
2. add the result to the existing $Y_1$,
3. divide the result by 10; this is the new $Y_1$, to be used on the next dial digit.

Obviously, the value of $Y_1$ will depend on the digit values of all previous dials. This provides the maximum possible compensation and is to be desired. It does, however, require that the process start off right for the first digit (representing least significant digit) generated. There is sufficient resolution that, if the accuracy permits, there can be generated from the reading of the least sigificant dial a 1/10th digit. This is done whether or not the value is in the output message. The least significant dial must also start off with the proper initial value of $Y_1$.

Before reading the least significant dial, the value of $Y_1$ is initialized to 128. Note that in calculating the 2560 count value of dial 1 (the least significant dial) there is first added 128 to the reading, and then subtract the initialized value of $Y_1$ (128) from it. In other words, it is unaffected. The process is as follows:

1. initialize $Y_1$ to 128,
2. generate $C_n$,
3. calculate the 12-bit value (W) in 2560 counts, including the IDC using $Y_1$,
4. save the high byte ($W_h$, $R_n$ for dial 1) as $W_s$
5. multiply W1 by 10, which is the new 12 bit word, W,
6. take the high byte, $W_h$ of the new value of W for the digit value, $R_n$, of $1/10^{th}$ of the least significant dial,
7. generate a new value of $Y_1$, as above,
8. check a jumper on the microprocessor port to see if the 1/1 dial is to be output;
   if this is not to be output then clear the new $W_h$ to all zeros,
   if this is to be output, then leave the new $W_h$ alone,
9. shift $W_h$ into the digit output routine in which the upper nibble is fashioned (P011) and attached to form the output byte,
10 retrieve $W_s$, redefine it as $W_h$,
11. generate $Y_1$ as above,
12. shift $W_h$ into the digit output routine in which the upper nibble is fashioned (P011) and attached to form the output byte,
13. proceed to read the remaining dials in the normal fashion.

There has thus been described in detail a preferred embodiment of the present invention. It is obvious that some changes might be made without departing from the scope of the invention which is set forth in the accompanying claims.

What is claimed is:

1. In a device for remotely reading the position of a plurality (n) of continuously movable position indicators representing less significant and more significant digits in any number system, movement of any more significant of two adjacent indicators being in a ratio of 1/N to the less significant of the two adjacent indicators where N is the base of the number system employed, a method of interdial compensation for minimizing the effect of errors in the apparent positions of the indicators comprising:

(a) sensing the readings of the least significant of said indicators to the nearest digit of the N-based numbering system;

(b) in ascending sequence starting with the least significant indicator and storing the compensated reading from each less significant indicator, if any, in a storage means;

(c) for each reading after the first, with adding means, adding a variable compensation value to the apparent value of the indicator being read based on a cumulative compensation value from the previous adjusted values of all lesser significant indicator, which tend to make the reading from each indicator one which falls exactly halfway between two adjacent integers on the more significant indicator being read responsive to the compensated value from all the previous less significant indicators;

(d) outputting the compensated value from each indicator as data.

2. The method according to claim 1 wherein said variable compensation value is generated by subtracting the equivalent of one-half digit from the more significant dial reading as the less significant adjusted dial reading approaches zero and adding the equivalent of one-half digit to the more significant dial reading as the less significant digit passes zero.

3. The method according to claim 2 and further when the less significant dial is farthest from the transistion point (halfway around the dial) zero is added to the more significant dial reading.

4. The method according to claim 1 wherein said variable compensation value is proportional to the digit value of the preceding less significant dial.

5. The method according to claim 4 wherein said cumulative compensation value is proportional to the cumulative sum of an adjustment value based on each preceding less significant dial, each of said adjustment values being equal to the digit reading of the prescribed preceding dial divided by the gear ratio between the dial being read and the prescribed dial.

6. The method according to claim 1 wherein the desired digit reading of any $n^{th}$ dial $D_n$ called $R_n$, is determined by the equation:

$$R_n = INT\left(\frac{10}{C}\left(C_n + \frac{C-1}{20} - \frac{C}{10}\sum_{i=0}^{n-1} R_i \frac{1}{10^{(n-1)}}\right)\right)$$

The terms are defined as:
n = Dial number (1 = Least significant dial),
C = Maximum permissible counts or states (again, this system uses 2560),
$C_n$ = Number of counts for Dial n (0–2559),
$R_i$ = Reading (decimal) for $i^{th}$ dial (integer from 0 to 9)
$R_n$ = Reading (decimal) for $n^{th}$ dial (integer from 0 to 9)
$R_{n-1}$ = Reading (decimal integer) for $(n-1)^{th}$ dial,
INT = Integer value of term which follows, truncate to decimal point.

7. In a device for remotely reading the positions of a plurality (n) of continuously movable position indicators representing less significant and more significant digits in any number system, movement of any more significant of two adjacent indicators being in a ratio of 1/N to the less significant of the two adjacent indicators where N is the base of the number system employed, a method of interdial compensation for minimizing the effect of errors in the apparent positions of the indicators by:

(a) generating a number called an interdial compensation value from the readings of all less significant dials;

(b) adding said number to the numerical reading of the dial being addressed to obtain a compensated reading;

(c) outputting said compensated reading as data.

8. The method according to claim 7 comprising the steps of:

(a) storing a preset interdial compensation value for the least significant indicator;

(b) sensing the reading of the least significant of said indicators to the nearest digit of the N-based numbering system;

(c) adding said initial interdial compensation value to said reading from step (b) to obtain a compensated reading;

(d) outputting said compensated reading from said least significant indicator as data;

(e) simultaneously converting said compensated reading to a second interdial compensation value for the next significant dial;

(f) storing said second interdial compensation value;

(g) sensing the reading of the next significant of said indicators to the nearest digit of the N-based numbering system;

(h) adding said second interdial compensation value obtained in step (e) to the reading of the next significant indicator obtained in step (g);

(i) repeating steps (d) through (h) until all indicators are sensed and compensated.

* * * * *